US011075385B2

(12) United States Patent
Arikawa et al.

(10) Patent No.: US 11,075,385 B2
(45) Date of Patent: Jul. 27, 2021

(54) NEGATIVE ELECTRODE ACTIVE MATERIAL FOR NONAQUEOUS SECONDARY BATTERY, AND NEGATIVE ELECTRODE AND NONAQUEOUS SECONDARY BATTERY USING THE SAME

(71) Applicant: MITSUBISHI CHEMICAL CORPORATION, Chiyoda-ku (JP)

(72) Inventors: Yuuya Arikawa, Kanagawa (JP); Teruyuki Okayasu, Kanagawa (JP); Rie Fujita, Kanagawa (JP); Aoi Sakai, Kanagawa (JP); Naomi Fujimori, Kanagawa (JP); Nobuhiko Ueno, Kanagawa (JP); Naoto Maru, Ibaraki (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 0 days.

(21) Appl. No.: 14/459,755

(22) Filed: Aug. 14, 2014

(65) Prior Publication Data

US 2014/0356708 A1     Dec. 4, 2014

Related U.S. Application Data

(63) Continuation of application No. PCT/JP2013/053433, filed on Feb. 13, 2013.

(30) Foreign Application Priority Data

Feb. 14, 2012  (JP) .............................. JP2012-029988
Mar. 30, 2012  (JP) .............................. JP2012-080655
May 16, 2012  (JP) .............................. JP2012-112317
Jun. 22, 2012  (JP) .............................. JP2012-141100
Jul. 27, 2012  (JP) .............................. JP2012-167659
Aug. 22, 2012  (JP) .............................. JP2012-183037
Dec. 18, 2012  (JP) .............................. JP2012-275819
Dec. 18, 2012  (JP) .............................. JP2012-275820
Jan. 16, 2013  (JP) .............................. JP2012-005457

(51) Int. Cl.
    *H01M 4/62*      (2006.01)
    *H01M 10/0525*   (2010.01)
    *H01M 4/587*     (2010.01)
    *H01M 4/133*     (2010.01)

(52) U.S. Cl.
    CPC .......... *H01M 4/628* (2013.01); *H01M 4/133* (2013.01); *H01M 4/587* (2013.01); *H01M 4/622* (2013.01); *H01M 10/0525* (2013.01); *H01M 2220/20* (2013.01); *Y02E 60/10* (2013.01); *Y02P 70/50* (2015.11)

(58) Field of Classification Search
    None
    See application file for complete search history.

(56) References Cited

U.S. PATENT DOCUMENTS

| 5,508,135 A | * | 4/1996 | Lelental | ................ | B41M 5/426 |
| | | | | | 430/527 |
| 6,537,468 B1 | | 3/2003 | Hata et al. | | |
| 2002/0037451 A1 | | 3/2002 | Eguchi et al. | | |
| 2002/0122985 A1 | * | 9/2002 | Sato | ...................... | H01G 9/155 |
| | | | | | 429/232 |
| 2008/0311472 A1 | | 12/2008 | Yamaguchi et al. | | |
| 2009/0061325 A1 | | 3/2009 | Odani et al. | | |
| 2010/0233525 A1 | * | 9/2010 | Kaiduka | ........... | H01M 10/0431 |
| | | | | | 429/164 |
| 2011/0250509 A1 | | 10/2011 | Yamaguchi et al. | | |
| 2014/0170486 A1 | | 6/2014 | Matsumura et al. | | |
| 2014/0349185 A1 | | 11/2014 | Momose et al. | | |

FOREIGN PATENT DOCUMENTS

| CN | 1304429 A | 7/2001 |
|---|---|---|
| CN | 1337752 A | 2/2002 |
| EP | 1 090 956 A1 | 4/2001 |
| JP | 04-248258 | 9/1992 |
| JP | 11-120992 | 4/1999 |
| JP | 2002-117851 | 4/2002 |
| JP | 2002-134171 | 5/2002 |
| JP | 2003-012311 | 1/2003 |
| JP | 2005-276604 | 10/2005 |
| JP | 2005-285731 | 10/2005 |
| JP | 2007-095494 | 4/2007 |
| JP | 2007-179765 | 7/2007 |
| JP | 2007-242411 | 9/2007 |
| JP | 2007-287570 | 11/2007 |
| JP | 2008-066260 | 3/2008 |
| JP | 2009-21229 | 1/2009 |
| JP | 2009-76433 | 4/2009 |
| JP | 2010-15885 | 1/2010 |
| JP | 2010-061930 A | 3/2010 |
| JP | 2010-061931 | 3/2010 |

(Continued)

OTHER PUBLICATIONS

Evidence 1: http://wikidiff.com/amide/carboxamide, see attached file.*
Evidence 2: https://en.wikipedia.org/wiki/Amide, see attached file.*
TK Agasti et al., Textbook of Anaesthesia for Postgraduates, p. 316. Jaypee Brothers Medical Publishers (P) LTD (New Delhi. St Louis. Panama City. London), 2011 First Edition.*

(Continued)

*Primary Examiner* — Zhongqing Wei
(74) *Attorney, Agent, or Firm* — Oblon, McClelland, Maier & Neustadt, L.L.P.

(57) ABSTRACT

The present invention is to provide a negative electrode active material for nonaqueous secondary batteries, which prevents increase in negative electrode resistance and improves initial charge/discharge efficiency and the effect of preventing gas generation and which is excellent in cycle characteristics. The present invention relates to a negative electrode active material for nonaqueous secondary batteries, which comprises an active material (A) capable of occluding and releasing lithium ions and an organic compound (B), wherein the organic compound (B) has a basic group and a lithium ion-coordinating group, and has a specific structure (S).

17 Claims, No Drawings

(56) References Cited

FOREIGN PATENT DOCUMENTS

| JP | 2010-061933 A | 3/2010 | | |
|---|---|---|---|---|
| JP | A-2010-061930 A | 3/2010 | | |
| JP | A-2010-061933 A | 3/2010 | | |
| JP | A-2010-061934 A | 3/2010 | | |
| JP | 2010-86955 | 4/2010 | | |
| JP | 2010-129528 A | 6/2010 | | |
| JP | 2011-134572 | 7/2011 | | |
| JP | 2013-41819 | 2/2013 | | |
| JP | 2013-55044 | 3/2013 | | |
| WO | WO 2008097723 A1 * | 8/2008 | ............ | H01M 4/13 |
| WO | 2012/132152 A1 | 10/2012 | | |
| WO | 2013/105623 A1 | 7/2013 | | |

OTHER PUBLICATIONS

U.S. Appl. No. 14/459,853, filed Aug. 14, 2014, Arikawa, et al.
Extended European Search Report dated Apr. 30, 2015 in Patent Application No. 13749883.8.
International Search Report dated Mar. 19, 2013 in PCT/JP2013/053433 filed Feb. 13, 2013.
Combined Office Action and Search Report dated Dec. 29, 2015 in Chinese Patent Application No. 201380008629.4 (with English translation).
Information Offer Form issued Aug. 16, 2016 in Japanese Patent Application No. 2013-014416 with English translation.
Information Offer Form issued Aug. 16, 2016 in Japanese Patent Application No. 2013-025856 with English translation.
Information Offer Form issued Aug. 9, 2016 in Japanese Patent Application No. 2013-025982 with English translation.
Office Action (Notification of Reasons for Refusal) dated Nov. 1, 2016 in Japanese Patent Application No. 2013-025853 with machine translation.
The Second Office Action dated Sep. 7, 2016 in Chinese Patent Application No. 201380008629.4 with English translation.
Japanese Office Action dated Oct. 25, 2016 in corresponding Japanese Patent application No. 2013-025856 with machine translation.
Japanese Office Action dated Oct. 25, 2016 in corresponding Japanese Patent application No. 2013-025982 with machine translation.
Office Action dated Feb. 24, 2017 in Japanese patent application No. 2013-025982 (with unedited computer generated English translation).
Office Action dated Feb. 24, 2017 in Japanese patent application No. 2013-025853 (with unedited computer generated English translation).
Office Action dated Jun. 19, 2017 in Chinese Patent Application No. 201380008629.4 (with Machine English translation).
Office Action dated Mar. 26, 2019, in Korean Patent Application No. 10-2014-7022024 (w/ Computer-generated English translation).

* cited by examiner

NEGATIVE ELECTRODE ACTIVE MATERIAL FOR NONAQUEOUS SECONDARY BATTERY, AND NEGATIVE ELECTRODE AND NONAQUEOUS SECONDARY BATTERY USING THE SAME

TECHNICAL FIELD

The present invention relates to a negative electrode active material for nonaqueous secondary batteries, a negative electrode for nonaqueous secondary batteries formed using the active material, and a nonaqueous secondary battery provided with the negative electrode.

BACKGROUND ART

Recently, with the background of development of electric vehicles and others, studies of lithium ion secondary batteries that are nonaqueous secondary batteries have been made actively, as high-energy density batteries. Regarding lithium ion secondary batteries, use of a carbon material such as graphite or the like as the negative electrode active material is known.

Above all, graphite having a large degree of graphitization provides, when used as the negative electrode active material in lithium ion secondary batteries, a capacity of around 372 mAh/g that is the theoretical capacity of lithium absorption of graphite, and is, in addition, excellent in cost-performance and durability, and consequently, it is known that graphite of the type is preferable as a negative electrode active material.

In case where the carbon material as above is used as the negative electrode active material in lithium ion secondary batteries, in general, a protective film called SEI (solid electrolyte interface) is formed through reaction with a polymer compound used as a binder or the like and with a nonaqueous electrolytic solution, on the surface of the carbon material. SEI interferes with contact between the carbon material and the electrolytic solution whereby the decomposition of the electrolytic solution by the active carbon material can be thereby prevented. As a result, it is known that the chemical stability of the surface of the negative electrode can be thereby maintained.

However, lithium ion secondary batteries using a carbon material as the negative electrode active material therein have some problems in that, owing to SEI coating film formation and gas generation as a product in side reaction therein, the charge/discharge irreversible capacity in the initial cycle increases and, as a result, the batteries could not have a high capacity. Further, formation of the stable SEI coating film provides another problem in that the interface resistance at the negative electrode increases and therefore the input/output characteristics of the batteries worsen.

For solving the above problems, there is known a technique of coating a carbon material of a negative electrode active material with a polymer or the like. For example, PTL 1 discloses a nonaqueous secondary battery in which a coating layer formed of an ion-conducting polymer or a water-soluble polymer is provided on the surface of the carbon material therein. According to PTL 1, the coating layer formed of an ion-conducting polymer such as polyethylene oxide or the like or a water-soluble polymer such as polyvinyl alcohol or the like fulfil the function of preventing decomposition of the nonaqueous electrolyte layer, or preventing deposition of the decomposed product of the constitutive component of the nonaqueous electrolyte layer on the surface of the negative electrode. Consequently, the reference says that the coating layer contributes toward improvement of the initial charge/discharge efficiency and improvement of cycle characteristics.

However, the above-mentioned polymer is insufficient in point of the adhesiveness thereof to carbon materials, and the initial discharge efficiency, the cycle characteristics and the stability are therefore still insufficient.

With that, an amino group has become specifically noted as a functional group having good adhesiveness. PTL 2 discloses a carbon material that has, as adhered thereto, an organic polymer having an aliphatic amino group in the side chain thereof.

The reference says that a polyallylamine is the most preferred as the organic polymer, and says, regarding the effect thereof, that the surface modification through adhesion of the organic polymer reduces the irreversible capacity in use of the carbon material as the negative electrode active material in nonaqueous secondary batteries.

PTL 3 discloses an electrode material composed of a carbon material and an organic polymer that covers the carbon material and has at least a tertiary nitrogen atom in the main chain thereof. The reference says that polyethyleneimine is the most preferred as the organic polymer, and says, regarding the effect thereof, that the discharge characteristics can be improved by reducing the specific surface area of the carbon material.

CITATION LIST

Patent Literature

PTL 1: JP-A 11-120992
PTL 2: JP-A 2002-117851
PTL 3: JP-A 2007-95494

SUMMARY OF INVENTION

Technical Problem

However, according to the investigations made by the present inventors, the reference says that, when a carbon material is coated with the ion-conducting polymer or the water-soluble polymer disclosed in PTL 1, then the initial charge/discharge efficiency and the cycle characteristics can be improved; but, in fact, the polymer is swollen by the electrolytic solution and further the adhesiveness of the polymer coating film to the carbon material is insufficient, and therefore the technique still has room for improvement.

On the other hand, PTL 2 discloses a carbon material that has, as adhered thereto, a polymer having an amino group of a functional group that has good adhesiveness to the surface of the carbon material; however, it has been clarified that using the carbon material of the type as a negative electrode active material improves the initial charge/discharge efficiency, but since the ionic conductivity of the polymer is insufficient, the interface resistance of the negative electrode (negative electrode resistance) tends to increase.

In addition, according to the techniques described in PTL 3, the initial charge/discharge efficiency could be improved in some degree as compared with that in the case of using an uncoated carbon material; however, the negative electrode resistance increase owing to the coating and the reductive decomposition of the electrolytic solution could not still be prevented sufficiently, and therefore a sufficient effect for gas generation prevention and cycle characteristics improvement could not be obtained.

The present invention has been made in consideration of the background art as above, and the object thereof is to provide a negative electrode active material for nonaqueous secondary batteries, which, in a nonaqueous secondary battery, can prevent the increase in the negative electrode resistance, can further more improve the initial charge/discharge efficiency, and can reduce the capacity loss accompanied by charge/discharge cycles.

Solution to Problem

The present inventors have assiduously studied for solving the above-mentioned problems and, as a result, have found that, in a negative electrode active material for nonaqueous secondary batteries that contains an active material (A) capable of occluding and releasing lithium ions (hereinafter this may be referred to as "active material (A)") and an organic compound (B), when a non-traditional compound is used as the organic compound (B), then there can be obtained a nonaqueous secondary battery which is excellent in cycle characteristics and in which the negative electrode resistance increase can be prevented and the initial charge/discharge efficiency and the gas generation preventing effect can be improved, and have completed the present invention.

Concretely, the organic compound (B) in the present invention is a compound satisfying the requirement that the compound has a basic group and a lithium ion-coordinating group, and further has at least one structure (S) selected from a group consisting of a graft structure, a star structure and a three-dimensional network structure.

Here the detailed reason why the negative electrode active material for nonaqueous secondary batteries of the invention that contain the above-mentioned organic compound (B) exhibits the above-mentioned effect is not clear, but as a result of the investigations made by the present inventors, it may be considered that the excellent battery characteristics would be provided by the following effects.

Specifically, when the organic compound (B) and the active material (A) having the characteristics as above are contained in the active material, then the basic structure that the organic compound (B) has may act on the surface of the active material (A) to thereby control the activity of the surface of the active material (A). In addition to the effect, the basic group can impart high adsorbability between the surface of the active material (A) and the organic compound (B).

Further, the lithium ion-coordinating group that the organic compound (B) has is expected to promote the desolvation relative to the lithium ions having solvated with electrolytic solution, and accordingly, the reductive decomposition of electrolytic solution can be prevented and the initial charge/discharge efficiency can be thereby improved. Furthermore, the lithium ion-coordinating group promotes diffusion of lithium ions inside the coating film formed on the surface of the carbon material, and therefore can prevent the increase in the negative electrode resistance.

Further, in addition to having the above-mentioned group, the organic compound (B) has at least one structure (S) selected from a group consisting of a graft structure, a star structure and a three-dimensional network structure, and therefore it is considered that the organic compound (B) could be prevented from being released from the active material (A) through charge/discharge cycles to thereby prevent cycle degradation.

From the above, the organic compound (B) is characterized by having a basic group and a lithium ion-coordinating group and further having at least one structure (S) selected from a group consisting of a graft structure, a star structure and a three-dimensional network structure. The organic compound (B) may be a single compound or may be a mixture of two or more different types of compounds.

Specifically, the gist of the present invention is as described below.

<1> A negative electrode active material for nonaqueous secondary batteries, which comprises an active material (A) capable of occluding and releasing lithium ions and an organic compound (B), wherein the organic compound (B) has a basic group and a lithium ion-coordinating group, and has at least one structure (S) selected from a group consisting of a graft structure, a star structure and a three-dimensional network structure.

<2> The negative electrode active material for nonaqueous secondary batteries according to the item <1> above, wherein the basic group is at least one selected from a group consisting of a primary amino group, a secondary amino group, a tertiary amino group and a quaternary ammonium group.

<3> The negative electrode active material for nonaqueous secondary batteries according to the item <1> or <2> above, wherein the lithium ion-coordinating group is at least one selected from a group consisting of an oxyalkylene group, a sulfonyl group, a sulfo group, a boron-containing functional group, a carbonyl group, a carbonate group, a phosphorus-containing functional group, an amide group, and an ester group.

<4> The negative electrode active material for nonaqueous secondary batteries according to any one of the items <1> to <3> above, wherein the structure (S) is formed by at least one selected from a group consisting of chemical crosslinking, physical crosslinking and ion complex crosslinking.

<5> The negative electrode active material for nonaqueous secondary batteries according to any one of the items <1> to <4> above, wherein the organic compound (B) further has a π-conjugated structure.

<6> The negative electrode active material for nonaqueous secondary batteries according to the item <5> above, wherein the π-conjugated structure is at least one selected from a group consisting of a benzene ring, a condensed aromatic ring and an aromatic hetero ring.

<7> A negative electrode active material for nonaqueous secondary batteries, which comprises an active material (A) capable of occluding and releasing lithium ions and a polymer (b), wherein, the polymer (b) contains a mixture of a polymer (b1) and a polymer (b2) or a reaction product thereof, the polymer (b1) is at least any one polymer of a homopolymer and a copolymer of an ethylenic unsaturated group-containing amine, the polymer (b2) is at least one polymer represented by the following general formula (1), and the content of the polymer (b2) relative to the polymer (b1) in the active material (A) is from 1% by mass to 300% by mass:

[Chem. 1]

(1)

(in the formula, $R^1$ and $R^2$ each independently represent a hydrogen atom, an alkyl group, an aryl group, an aralkyl group, a glycidyl group or an epoxy group, AO represents an oxyalkylene group having from 2 to 5 carbon atoms, n indicates an integer of from 1 to 50).

<8> The negative electrode active material for nonaqueous secondary batteries according to the item <7> above, wherein the polymer (b1) is a polymer selected from a group consisting of polyvinylamine, polyallylamine, poly-N-methylallylamine, poly-N,N-dimethylallylamine, polydiallylamine, and poly-N-methyldiallylamine.

<9> The negative electrode active material for nonaqueous secondary batteries according to the item <7> or <8> above, wherein the polymer (b) accounts for from 0.01 to 10% by mass relative to the active material (A).

<10> An organic compound for use for a negative electrode active material for nonaqueous secondary batteries, which comprises a basic group and a lithium ion-coordinating group and has at least one structure (S) selected from a group consisting of a graft structure, a star structure and a three-dimensional network structure.

<11> A negative electrode for nonaqueous secondary batteries, which is formed using the negative electrode active material for nonaqueous secondary batteries as described in any one of the items <1> to <9> above.

<12> A nonaqueous secondary battery comprising a positive electrode and a negative electrode capable of occluding and releasing lithium ions, and an electrolyte, wherein the negative electrode is the negative electrode for nonaqueous secondary batteries as described in the item <11> above.

Advantageous Effects of Invention

The negative electrode active material for nonaqueous secondary batteries of the present invention is, when used as a negative electrode material in nonaqueous secondary batteries, able to provide a nonaqueous secondary battery which can prevent the negative electrode resistance from increasing and can improve the initial charge/discharge efficiency and the gas generation preventing effect and which is excellent in cycle characteristics.

DESCRIPTION OF EMBODIMENTS

The contents of the present invention are described in detail hereinunder. The following description includes some examples (typical examples) of embodiments of the invention, and not overstepping the scope and the spirit thereof, the present invention is not limited to these embodiments.

Here, "% by weight" and "% by mass" are synonymous to each other. Simple expression of "ppm" indicates "ppm by weight".

The negative electrode active material for nonaqueous secondary batteries of the present invention is a negative electrode active material for nonaqueous secondary batteries containing an active material (A) capable of occluding and releasing lithium ions and an organic compound (B), wherein the organic compound (B) has a basic group and a lithium ion-coordinating group and has at least one structure (S) selected from a group consisting of a graft structure, a star structure and a three-dimensional network structure.

<Active Material (A)>

Not specifically defined, the active material (A) in the present invention may be any substance capable of absorbing/releasing lithium ions, and for example, includes graphite, amorphous carbon, and a carbonaceous substance having a small degree of graphitization, and silicon. Above all, preferred is graphite. Also usable here are those prepared by coating these with a carbonaceous substance, for example, amorphous carbon or a graphitized substance.

In the present invention, one alone or two or more different types of these may be used either singly or as combined.

Graphite is commercially available with ease and has a high charge/discharge capacity of theoretically 372 mAh/g, and in addition, as compared with a case of using any other negative electrode active material, use of graphite is expected to attain a significant effect of improving charge/discharge characteristics at a high current density, and is therefore preferred. Above all, graphite with few impurities is preferred, and if desired, graphite may be purified according to known methods before use herein. Regarding the type thereof, graphite includes natural graphite and artificial graphite, and natural graphite is more preferred for use herein.

The artificial graphite includes, for example, those produced by firing and graphitizing organic substances such as coal tar pitch, coal-based heavy oil, atmospheric residue, petroleum-based heavy oil, aromatic hydrocarbon, nitrogen-containing cyclic compounds, sulfur-containing cyclic compounds, polyphenylene, polyvinyl chloride, polyvinyl alcohol, polyacrylonitrile, polyvinyl butyral, natural polymer, polyphenylene sulfide, polyphenylene oxide, furfuryl alcohol resin, phenol-formaldehyde resin, imide resin, etc.

The firing temperature may be within a range of 2500° C. or higher and 3200° C. or lower, and in firing, a silicon-containing compound or a boron-containing compound may be used as a graphitization catalyst.

The natural graphite includes, for example, highly-purified flaky graphite and spheronized graphite. Above all, more preferred is spheronized natural graphite from the viewpoint of the particles fillability and the charge/discharge load characteristics thereof.

As the apparatus for use for the spheronization treatment, for example, usable here is an apparatus capable of repeatedly giving a mechanical action such as compression, friction, shear force or the like including interaction of graphite carbonaceous substance particles of mainly impact force, to particles.

Concretely, an apparatus is preferred here, which has a rotor equipped with a large number of blades inside the casing thereof and in which the rotor is rotated at a high speed to thereby impart a mechanical action such as impact compression, friction, shear force or the like to the carbon material introduced inside the apparatus for surface treatment of the material therein. Also preferred is an apparatus having a mechanism of repeatedly imparting mechanical action through circulation of graphite therein.

As a preferred apparatus of imparting mechanical action to carbon material, for example there are mentioned hybridization system (by Nara Machinery), Cryptron (by EARTH-TECHNICA), CF mill (by Ube Industries), mechanofusion system (by Hosokawa Micron), theta composer (by Tokuju Corporation), etc. Of those, preferred is Nara Machinery's hybridization system.

In case where the treatment is carried out using the above-mentioned apparatus, it is desirable that the peripheral speed of the rotating rotor is generally from 30 to 100 msec, preferably from 40 to 100 msec, more preferably from 50 to 100 m/sec. For the treatment of imparting mechanical action to carbon material, graphite may be led to merely pass through the apparatus, however, it is desirable that graphite is circulated or kept in the apparatus for at least 30 seconds for the treatment, and more preferably, graphite is circulated or kept in the apparatus for at least 1 minute.

As the amorphous carbon, for example, there are mentioned particles prepared by firing a bulk mesophase and particles prepared by infusibilizing a carbon precursor followed by firing it.

As the carbonaceous substance having a small degree of graphitization, there are mentioned those prepared by firing an organic material generally at a temperature lower than 2500° C. The organic material includes coal-based heavy oil such as coal tar pitch, carbonized liquefied oil, etc.; straight-run heavy oil such as atmospheric residue, vacuum residue, etc.; petroleum-based heavy oil such as cracked heavy oil of, for example, ethylene tar to be produced as a side product in thermal cracking of crude oil, naphtha or the like, etc.; aromatic hydrocarbon such as acenaphthylene, decacyclene, anthracene, etc.; nitrogen-containing cyclic compounds such as phenazine, acridine, etc.; sulfur-containing cyclic compounds such as thiophene, etc.; aliphatic cyclic compounds such as adamantane, etc.; polyphenylene such as biphenyl, terphenyl, etc.; polyvinyl chloride; polyvinyl esters such as polyvinyl acetate, polyvinyl butyral, etc.; thermoplastic polymers such as polyvinyl alcohol, etc.

In accordance with the degree of graphitization of the carbonaceous substance, the firing temperature may be generally within a range of 600° C. or higher, preferably 900° C. or higher, more preferably 950° C. or higher, and may be generally lower than 2500° C., preferably 2000° C. or lower, more preferably 1400° C. or lower.

In firing, acids such as phosphoric acid, boric acid, hydrochloric acid or the like, and alkalis such as sodium hydroxide or the like may be mixed in the organic material.

As the active material (A), also usable are particles prepared by coating the above-mentioned natural graphite or artificial graphite with amorphous carbon and/or a graphitized substance having a small degree of graphitization. In addition, the active material may contain oxides or any other metals. The other metals include Sn, Si, Al, Bi and others capable of alloying with Li.

The carbon material that constitutes the active material (A) may be combined with one or more of any other carbon materials.

The active material (A) in the present invention preferably has the following physical properties.

The mean particle size (d50) of the active material (A) is generally 1 μm or more and 50 μm or less. Falling within the range can prevent process disadvantages such as striation in negative material forming materials, and on the other hand, can control the surface area of the active material to fall within a suitable range to thereby easily facilitate the activity thereof with electrolytic solution.

The mean particle size (d50) is preferably 4 μm or more, more preferably 10 μm or more, and is preferably 30 μm or less, more preferably 25 μm or less. In this description, the mean particle size (d50) means a volumetric basis median size. Concretely, 0.01 g of a sample is suspended in 10 mL of a 0.2 mass % aqueous solution of a surfactant, polyoxyethylene sorbitan monolaurate, introduced into a commercially-available laser diffraction/scattering particle sizer, irradiated with ultrasonic waves at 28 kHz at an output of 60 W for 1 minute, and thus analyzed to measure a value of the volumetric basis median size of the sample in the particle sizer.

The specific surface area of the active material (A) in the present invention, as measured according to the BET method (BET method specific surface area), is generally 1 $m^2/g$ or more and 11 $m^2/g$ or less. Falling within the range could secure a sufficient site where Li ions move in and out and therefore could secure good high-speed charge/discharge characteristics and output characteristics, and accordingly, the activity of the active material to electrolytic solution can be controlled to reduce the initial irreversible capacity and further the battery capacity can be readily increased.

The BET specific surface area is preferably 1.2 $m^2/g$ or more, more preferably 1.5 $m^2/g$, and is preferably and 10 $m^2/g$ or less, more preferably 9 $m^2/g$ or less, even more preferably 8 $m^2/g$ or less. In this description, the BET method specific surface area is a value measured according to a BET five-point method of a nitrogen gas adsorption distribution method, using a specific surface area measuring apparatus.

In case where graphite is used as the active material (A) in the present invention, the spacing $d_{002}$ of the plane (002) thereof, as measured according to a wide-angle X-ray diffraction method, is generally 0.335 nm or more and is less than 0.340 nm, preferably 0.339 or less, more preferably 0.337 or less. When the value $d_{002}$ is less than 0.340 nm, then the active material can have suitable crystallinity, and can prevent the increase in the initial irreversible capacity. 0.335 nm is a theoretical value of graphite.

<Organic Compound (B)>

The organic compound (B) in the present invention has a basic group and a lithium ion-coordinating group and has at least one structure (S) selected from a group consisting of a graft structure, a star structure and a three-dimensional network structure, and the organic compound (B) may be a single compound or a mixture of two or more compounds of that type.

In case of a single compound, the organic compound (B) is composed of a single molecule having both a basic group and a lithium ion-coordinating group in the molecule, and is preferably composed of a single molecule having a basic group, a lithium ion-coordinating group and a π-conjugated structure in the molecule.

Further, the molecule has at least one structure (S) selected from a group consisting of a graft structure, a star structure and a three-dimensional network structure.

Preferably, the organic compound (B) has the above-mentioned structure (S) formed through complexation of two or more organic compounds. An example of complexation is gelation.

The single compound may be a reaction product (hereinafter this may be referred to as a reaction product of (B1-B2)) of a basic group-having compound (hereinafter this may be referred to as an organic compound (B1)) and a lithium ion-coordinating group-having compound (hereinafter this may be referred to as an organic compound (B2), and is preferably a reaction product (hereinafter this may be referred to as a reaction product (B1-B2-B3)) of the organic compound (B1), the organic compound (B2) and a π-conjugated structure-having compound (hereinafter this may be referred to as an organic compound (B3)).

The above-mentioned single compound may be a low-molecular compound or a polymer compound, but is preferably a polymer compound (this may be referred to as a polymer (b')) from the viewpoint of effectively preventing gas generation.

In case where the organic compound (B) is a polymer (b'), the weight-average molecular weight thereof is, though not specifically defined, generally at least 500, preferably at least 1000, more preferably at least 2000, even more preferably at least 2500. On the other hand, the weight-average molecular weight is generally at most 1,000,000, preferably 500,000, more preferably 300,000, even more preferably 200,000.

In this description, the weight-average molecular weight is a standard polystyrene-equivalent weight-average molecular weight that is measured through gel permeation chromatography (GPC) with a solvent tetrahydrofuran (THF), or a standard polyethylene glycol-equivalent weight-average molecular weight that is measured through GPC with an aqueous solvent or with a solvent of dimethylformamide (DMF) or dimethylsulfoxide (DMSO).

In case where the organic compound (B) is a mixture of two or more compounds, the constitution of the organic compound (B) includes 1) a mixture containing the organic compound (B1) and the organic compound (B2); 2) a mixture containing the organic compound (B1), the organic compound (B2) and the organic compound (B3); 3) a mixture containing the reaction product (B1-B2) and the organic compound (B3); 4) a mixture containing a reaction product (hereinafter this may be referred to as a reaction product (B1-B3)) of the organic compound (B1) and the organic compound (B3), and the organic compound (B2); 5) a mixture containing a reaction product (hereinafter this may be referred to as a reaction product (B2-B3)) of the organic compound (B2) and the organic compound (B3), and the organic compound (B1); 6) a mixture containing the reaction product (B1-B3) and the reaction product (B2-B3); 7) a mixture containing the reaction product (B1-B2) and the reaction product (B2-B3); 8) a mixture containing the reaction product (B1-B2) and the reaction product (B1-B3); 9) a mixture containing the reaction product (B1-B2) and the organic compound (B1); 10) a mixture containing the reaction product (B1-B2) and the organic compound (B2); 11) a mixture containing the reaction product (B1-B2) and the organic compound (B1) and the organic compound (B2); 12) a mixture of any of the above 9) to 11) further containing the organic compound (B3); etc.

In this description, the mixture of the organic compound (B1) and the organic compound (B2) means that both the organic compound (B1) and the organic compound (B2) are contained in the negative electrode active material for nonaqueous secondary batteries, and it is not always necessary that the two compounds are mixed in the production step for the negative electrode active material for nonaqueous secondary batteries.

Even in a case where the mixture is used as the main organic compound (B), the organic compounds in the mixture may react with each other in production of the active material of the present invention. In such a case, the content ratio of the mixture of the organic compounds and the reaction product thereof is such that the proportion of the mixture to the total amount of the organic compound (B) (content relative to the active material (A)) is generally at least 50% by mass, preferably at least 80% by mass, more preferably at least 90% by mass, even more preferably at least 99% by mass.

The same shall apply to the case where the organic compound (B3) and/or various reaction products are mixed in the mixture.

For example, in case where the reaction product (B1-B2) of the organic compound (B1) and the organic compound (B2) is used, the reaction product (B1-B2) may be formed through reaction under heat of the organic compound (B1) and the organic compound (B2) after the organic compound (B1) and the organic compound (B2) have been adhered to the active material (A). Alternatively, the organic compound (B1) and the organic compound (B2) may be reacted to give the reaction product (B1-B2) and this may be adhered to the active material (A).

From the viewpoint of the adhesiveness to the active material (A) and the surface activity of the reaction product, the former is preferred.

The reaction temperature to form the reaction product (B1-B2) may be from 30 to 200° C. The organic compound (B2) to be used within the temperature range is preferably one having an epoxy group or a glycidyl group at the end thereof. The epoxy group or the glycidyl group corresponds to $R^1$ and $R^2$ in the formula (1) shown below.

As the configuration of the organic compound (B), preferred is one comprising a mixture containing the organic compound (B1) and the organic compound (B2) or a reaction product of the two, and more preferred is one comprising a mixture containing the organic compound (B1), the organic compound (B2) and the organic compound (B3) or a reaction product of the three, from the viewpoint of high adsorbability thereof to the surface of the active material (A), and for the reason that the configuration can secure lithium ion conductivity and productivity.

Concretely, a mixture of the organic compound (B1), the organic compound (B2) and the organic compound (B3) is the most preferred, next the reaction product (B1-B2-B3) or a mixture of the reaction product (B1-B2) and the organic compound (B3) is preferred, next a mixture of the organic compound (B1) and the organic compound (B2) is preferred, and next the reaction product (B1-B2) is preferred.

In case where the organic compound (B) is a polymer (b) of two or more compounds as mixed, the basic group-having organic compound (B1) corresponds to a polymer (b1) and the lithium ion-coordinating group-having organic compound (B2) corresponds to a polymer (b2). The polymer (b1) and the polymer (b2) are described hereinunder.

(1. Basic Group)

The basic group in the organic compound (B) in the present invention reacts with the functional group in the surface of the active material (A) to suppress the surface activity of the active material (A). In addition, the basic group enhances the adsorbability between the surface of the active material (A) and the organic compound (B) and therefore prevents the decomposition of electrolytic solution, thus exhibiting an additional effect of providing further excellent cycle characteristics.

The basic group in the organic compound (B) in the present invention is defined as a group of donating an electron pair, and not specifically defined so far as satisfying the definition, the group includes, for example, a primary amino group, a secondary amino group, a tertiary amino group and a quaternary ammonium group.

Of those, preferred are a primary amino group, a secondary amino group and a tertiary amino group; and from the viewpoint of adhesiveness to the functional group in the surface of the active material and of high reactivity, more preferred are a primary amino group and a secondary amino group.

The basic group-having organic compound (B1) is described below.

For example, the organic compound (B1) includes those having a unit derived from an ethylenic unsaturated group-containing amine. Concretely, there are mentioned those having a unit represented by the following formula (2) or (3).

[Chem. 2]

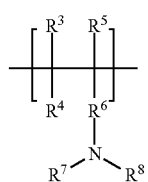

(2)

(In the formula (2), $R^3$ to $R^5$ each independently represent a hydrogen atom or an alkyl group having from 1 to 6 carbon atoms; $R^6$ represents a single bond with no atom, or an alkylene group having from 1 to 6 carbon atoms; $R^7$ and $R^8$ each independently represent a hydrogen atom or an alkyl group having from 1 to 6 carbon atoms.)

[Chem. 3]

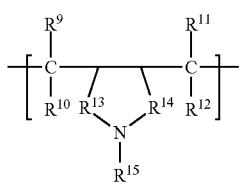

(3)

(In the formula (3), $R^9$ to $R^{12}$ each independently represent a hydrogen atom or an alkyl group having from 1 to 6 carbon atoms; $R^{13}$ and $R^{14}$ each independently represent an alkylene group having from 1 to 6 carbon atoms; $R^{15}$ represents a hydrogen atom or an alkyl group having from 1 to 6 carbon atoms.)

The alkyl group having from 1 to 6 carbon atoms in the formulae (2) and (3) may be linear or branched, and includes, for example a methyl group, an ethyl group, a propyl group, an isopropyl group, a butyl group, an isobutyl group, a tert-butyl group, a pentyl group, a hexyl group, etc. Preferred is a methyl group.

The alkylene group having from 1 to 6 carbon atoms in the formulae (2) and (3) may be linear or branched, and includes, for example, a methylene group, an ethylene group. Preferred is a methylene group.

In the formula (2), $R^3$ to $R^5$ are preferably each independently represent a hydrogen atom or a methyl group, and more preferably a hydrogen atom; $R^6$ is preferably a single bond with no atom, or a methylene group; and $R^7$ and $R^8$ are preferably each independently a hydrogen atom or a methyl group, more preferably a hydrogen atom.

Above all, more preferred is a unit represented by the formula (2) where $R^3$ to $R^5$ are all hydrogen atoms, $R^6$ is a single bond with no atom or a methylene group, and $R^7$ and $R^8$ are hydrogen atoms. The case where $R^7$ and $R^8$ are hydrogen atoms and the organic compound (B1) has a primary amino group is preferred as the adhesiveness or the reactivity of the compound to/with the surface of the active material (A) is high.

In the formula (3), $R^9$ to $R^{12}$ are preferably each independently a hydrogen atom or a methyl group, more preferably a hydrogen atom; $R^{13}$ and $R^{14}$ are preferably methylene groups; $R^{15}$ is preferably a hydrogen atom or a methyl group, more preferably a hydrogen atom.

Above all, more preferred is a unit represented by the formula (3) where $R^9$ to $R^{12}$ are all hydrogen atoms, $R^{13}$ and $R^{14}$ are methylene groups and $R^{15}$ is a hydrogen atom. The case where $R^{15}$ is a hydrogen atom and the organic compound (B1) has a secondary amino group is preferred as the adhesiveness or the reactivity of the compound to/with the surface of the active material is high.

The organic compound (B1) may contain any of the unit of the formula (2) or the unit of the formula (3), and may also contain both the units of the formulae (2) and (3).

Further, the organic compound (B1) may contain any other unit than the units of the formula (2) and the formula (3), and for example, the other unit includes those derived from maleic acid, acrylamide, sulfur dioxide, vinylsulfonic acid, styrene, etc.

Having a basic group, the organic compound (B1) may be a low-molecular compound or a high-molecular compound. From the viewpoint of effectively preventing gas generation, preferred is a high-molecular compound of the polymer (b1).

In case where the organic compound (B1) is a low-molecular compound, preferred is a compound of vinylamine, allylamine or their derivatives.

As vinylamine, allylamine and their derivatives, for example, there are mentioned vinylamine, N-alkyl-substituted vinylamine (N-methylvinylamine, etc.), N,N-dialkyl-substituted vinylamine (N,N-dimethylvinylamine, etc.), divinylamine, N-alkyl-substituted divinylamine (N-methyldivinylamine, etc.), alkylamine, N-alkyl-substituted allylamine (N-methylallylamine, etc.), N,N-dialkyl-substituted allylamine (N,N-dimethylallylamine, etc.), diallylamine, N-alkyl-substituted diallylamine (N-methyldiallylamine, etc.), and their dimers or trimers, etc.

The organic compound (B1) may be in the form of salts such as acetates, hydrochlorides, sulfates, amidesulfates, ammonium salts, etc. In the compound, the amine moiety may be modified through partial urearization or the like.

One embodiment where the organic compound (B1) is a polymer (b1), the weight-average molecular weight of the compound may be referred to as an index thereof.

Not specifically defined, the weight-average molecular weight of the polymer (b1) is generally at least 500, preferably at least 1000, more preferably at least 2000, even more preferably at least 2500. On the other hand, the weight-average molecular weight is generally at most 1,000,000, preferably at most 500,000, more preferably at most 300,000, even more preferably at most 200,000.

The polymer (b1) is preferably at least any one of a homopolymer or a copolymer of an amine containing an ethylenic unsaturated group. Concretely, the polymer is preferably at least any one of a homopolymer or a copolymer of vinylamine, allylamine or a derivative thereof.

As the polymer (b1), usable here are a homopolymer of any of the above-mentioned vinylamine, allyl amine or a derivative thereof, a copolymer of two or more of the above-mentioned vinylamine, allylamine or a derivative thereof, or a copolymer of any one or more of the above-mentioned vinylamine, allylamine or a derivative thereof, and any other one or more components.

Further, as the other component, usable here are maleic acid, acrylamide, sulfur dioxide, etc. The copolymer containing the other component includes, for example, a diallylamine-maleic acid copolymer.

The polymer (b1) is preferably a homopolymer or a copolymer of vinylamine, allylamine, N-alkyl-substituted allylamine (N-methylallylamine, etc.), N,N-dialkyl-substituted allylamine (N,N-dimethylallylamine, etc.) or diallylamine, from the viewpoint initial charge/discharge efficiency, and is more preferably polyvinylamine, polyallylamine, poly-N-methylallylamine, poly-N,N-dimethylallylamine, polydiallylamine or poly-N-methyldiallylamine, most preferably polyvinylamine or polyallylamine.

(2. Lithium Ion-Coordinating Group)

The lithium ion-coordinating group preferred in the present invention (hereinafter this may be simply referred to as a "lithium ion-coordinating group") is defined as a group having a nonconjugated electron pair. Though not specifically defined thereto, the group is preferably at least one selected from an oxyalkylene group, a sulfonyl group, a sulfo group, a boron-containing functional group, a carbonyl group, a carbonate group, a phosphorus-containing functional group, an amide group, and an ester group.

Of those, more preferred examples of an oxyalkylene group include an oxymethylene group, an oxyethylene group, an oxypropylene group, etc.

The lithium ion-coordinating group of the type is expected to exhibit an effect of promoting desolvation of lithium ions having solvated with electrolytic solution. With that, reductive decomposition of electrolytic solution can be prevented and initial charge/discharge efficiency can be improved. Further, the lithium ion-coordinating group promotes diffusion of lithium ions in the coating film of the film-coated active material (A), and can therefore prevent increase in negative electrode resistance.

The lithium ion-coordinating group-having organic compound (B2) is described below.

Having a lithium ion-coordinating group, the organic compound (B2) may be a low-molecular compound or a high-molecular compound. From the viewpoint of effectively preventing gas generation, preferred is a high-molecular compound of the polymer (b2).

The organic compound (B2) may be a single compound of a lithium ion-coordinating group-having organic compound or a mixture of two or more such compounds.

The content of the organic compound (B2) relative to the organic compound (B1) in the negative electrode active material for nonaqueous secondary batteries of the present invention is generally from 1% by mass to 300% by mass, from the viewpoint that a sufficient amount of the organic compound (B1) can react with the active material (A) to prevent increase in negative electrode resistance, but preferably from 2% by mass to 150% by mass, more preferably from 3% by mass to 100% by mass, even more preferably from 4% by mass to 50% by mass, still more preferably from 5% by mass to 40% by mass.

In case where the organic compound (B2) is a low-molecular compound, the compound includes, for example, ethylene glycol, diethylene glycol, triethylene glycol, succinic acid, succinic anhydride, sultone, taurine, monoses, oligosaccharides, cyclodextrin, crown ether, benzenesulfonic acid and its salts, naphthalenesulfonic acid and its salts, acetic acid and its salts, benzoic acid and its salts, amino acids and their salts, boric acid and its salts, lactic acid and its salts, dibutyl carbonate, etc. Above all, from the viewpoint of low solubility thereof in electrolytic solution, preferred are succinic acid, succinic anhydride, sultone, taurine, monoses, oligosaccharides, cyclodextrin, benzenesulfonic acid and its salts, naphthalenesulfonic acid and its salts, acetic acid and its salts, benzoic acid and its salts, amino acids and their salts, boric acid and its salts, and dibutyl carbonate.

The polymer (b2), which is one preferred embodiment of the present invention where the organic compound (B2) is a high-molecular compound, is represented by the following formula (1).

[Chem. 4]

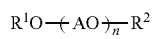

(1)

(In the formula, $R^1$ and $R^2$ each independently represent a hydrogen atom, an alkyl group, an aryl group, an aralkyl group, a glycidyl group or an epoxy group. AO represents an oxyalkylene group having from 2 to 5 carbon atoms, and n indicates an integer of from 1 to 50.)

The glycidyl group is a functional group represented by the following formula (4), and the epoxy group is a functional group represented by the following formula (5).

[Chem. 5]

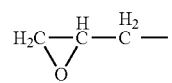

(4)

[Chem. 6]

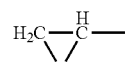

(5)

The alkyl group in the above formula (1) may be linear or branched, and is, for example, an alkyl group having from 1 to 20 carbon atoms. From the viewpoint of preventing increase in negative electrode resistance, preferred is an alkyl group having from 1 to 15 carbon atoms, and more preferred is an alkyl group having from 1 to 10 carbon atoms.

The aryl group in the above formula (1) is, for example, an unsubstituted or alkyl group-substituted phenyl group. From the viewpoint of easy availability of the material, preferred is an unsubstituted phenyl group or a phenyl group substituted with an alkyl group having from 1 to 4 carbon atoms, and more preferred is an unsubstituted phenyl group.

The aralkyl group in the above formula (1) is, for example, an unsubstituted or alkyl group-substituted benzyl group. From the viewpoint of easy availability of the material, preferred is an unsubstituted benzyl group or a benzyl group substituted with an alkyl group having from 1 to 4 carbon atoms, and more preferred is an unsubstituted benzyl group.

$R^1$ and $R^2$ in the above formula (1) each are preferably a hydrogen atom, an alkyl group, an epoxy group or a glycidyl group, from the viewpoint of initial charge/discharge efficiency, and more preferably an alkyl group, an epoxy group or a glycidyl group, more preferably a glycidyl group.

AO in the above formula (1) is an oxyalkylene group having from 2 to 5 carbon atoms, and is, from the viewpoint of preventing increase in negative electrode resistance, preferably an oxyethylene group or an oxypropylene group.

Regarding the combination of $R^1$ and $R^2$ and AO, preferably, $R^1$ and $R^2$ each are independently a hydrogen atom, an alkyl group, an epoxy group or a glycidyl group, and AO is an oxyalkylene group having from 2 to 5 carbon atoms. More preferably, $R^1$ and $R^2$ each are independently an alkyl group, an epoxy group or a glycidyl group, and AO is an oxyalkylene group having from 2 to 5 carbon atoms. Even more preferably, $R^1$ and $R^2$ each are independently an alkyl group, an epoxy group or a glycidyl group, and AO is an oxyethylene group or an oxypropylene group. Most preferably, $R^1$ and $R^2$ are both glycidyl group, and AO is an oxyethylene group or an oxypropylene group n in the above formula (1) indicates the number of oxyalkylene groups in the formula, and from the viewpoint of preventing increase in negative electrode resistance, n is preferably an integer of from 1 to 25.

Concretely, the polymer (b2) includes polyoxyethylene glycol diglycidyl ether, polyoxypropylene glycol diglycidyl ether, butoxypolyethylene glycol glycidyl ether.

Not specifically defined, the weight-average molecular weight of the polymer (b2) is generally at least 50, preferably at least 150, more preferably at least 300, even more preferably at least 350. On the other hand, the weight-average molecular weight is generally at most 1,000,000, preferably at most 500,000, more preferably at most 10,000, even more preferably at most 5,000.

In the active material of the present invention, the organic compounds (B1)+(B2) are contained in a proportion of generally at least 0.01% by mass relative to the active material (A), preferably at least 0.1% by mass, and is generally at most 10% by mass, preferably at most 5% by mass. When the proportion is less than 0.01% by mass, then it would be difficult to effectively coat the active material (A); but on the other hand, when the proportion is more than 10% by mass, then the interfacial resistance between the active material (A) and the coating layer would increase.

(3. π-Conjugated Structure)

Preferably, the organic compound (B) in the present invention further contains a π-conjugated structure-having compound (B3) from the viewpoint of the ability thereof to effectively inhibit gas generation and inhibit increase in negative electrode resistance. The π-conjugated structure reacts with the π-plain structure part that the active material (A) has, and selectively coats the surface of the active material (A), and therefore it is considered that the compound can effectively prevent gas generation and can prevent increase in negative electrode resistance.

In this description, the π-conjugated structure-having compound is defined as follows. The compound is an unsaturated cyclic compound having a structure where atoms having π-electrons are aligned circularly, and satisfies the Huckel rule, in which the π-electrons are delocalized on the ring and the ring has a plane structure.

The π-conjugated structure includes rings having a skeleton of a monocyclic 5-membered ring such as furan, pyrrole, imidazole, thiophene, phosphole, pyrazole, oxazole, isoxazole, thiazole; a monocyclic 6-membered ring such as benzene, pyridine, pyrazine, pyrimidine, pyridazine, triazine; a bicyclic 5-membered ring+6-membered ring such as benzofuran, isobenzofuran, indole, isoindole, benzothiophene, benzophosphole, benzimidazole, purine, indazole, benzoxazole, benzisoxazole, benzothiazole; a bicyclic 6-membered ring+6-membered ring such as naphthalene, quinoline, isoquinoline, quinoxaline, quinazoline, cinnoline; a polycyclic ring such as anthracene, pyrene or the like.

Of those, preferred is at least one selected from a group consisting of benzene rings, condensed aromatic rings and aromatic hetero rings from the viewpoint of preventing gas generation in use in nonaqueous secondary batteries. As the condensed aromatic ring, preferred is a naphthalene ring.

The π-conjugated structure-having organic compound (B3) is described below.

Having a π-conjugated structure, the organic compound (B3) may be a low-molecular compound or a high-molecular compound. From the viewpoint of effectively preventing gas generation, preferred is a high-molecular compound (hereinafter this may be referred to as a polymer (b3)).

From the viewpoint of improving the resistance to electrolytic solution of the negative electrode active material for nonaqueous secondary batteries of the present invention and of making the coating film of the negative electrode active material (A) layer hardly eluting out in electrolytic solution, more preferably, the organic compound (B3) is hardly soluble in nonaqueous electrolytic solution. Hardly soluble in nonaqueous electrolytic solution means that, when the organic compound (B3) is immersed in a mixed solvent of ethyl carbonate and ethylmethyl carbonate in a ratio by volume of 3/7 for 24 hours, the dry weight reduction before and after the immersion is at most 10% by mass.

The organic compound hardly soluble in nonaqueous electrolytic solution preferably has an ionic group. The ionic group is a group capable of forming an anion or a cation in water, and its examples include a carboxylic acid group, a sulfonic acid group, a phosphoric acid group, a phosphonic acid group and their salts. The salts include lithium salts, sodium salts, potassium salts, etc. Of those, preferred is a sulfonic acid group or its lithium salt or sodium salt, from the viewpoint of the initial irreversible capacity in use thereof in nonaqueous secondary batteries.

In the active material of the present invention, the organic compound (B3) is contained in a proportion of generally at least 0.01% by mass relative to the active material (A), preferably at least 0.1% by mass, and is generally at most 9.99% by mass, preferably at most 5% by mass. When the proportion is less than 0.01% by mass, then it would be difficult to effectively coat the active material (A); but on the other hand, when the proportion is more than 10% by mass, then the interfacial resistance between the active material (A) and the coating layer would increase.

The organic compound (B3) described above for use herein may be a commercially-available one, or may be synthesized according to a known method. One or more of the organic compounds may be used in the present invention either singly or as combined.

In case where the organic compound (B3) is a low-molecular compound, the organic compound (B3) includes naphthalenesulfonic acid, lithium naphthalenesulfonate, sodium naphthalenesulfonate, benzenesulfonic acid, sodium benzenesulfonate, anthracenesulfonic acid, sodium anthracenesulfonate, etc.

In case where the organic compound (B3) is a high-molecular compound of a polymer (b3), the polymer (b3) has an ionic group and an aromatic ring.

The monomer from which the constitutive unit to constitute the polymer (b3) is derived includes a monomer having an ionic group and an aromatic ring. The polymer (b3) may be a copolymer of a monomer having an ionic group but not having an aromatic ring, and a monomer having an aromatic ring but not having an ionic group.

Examples of the monomer having an ionic group and an aromatic ring include styrenesulfonic acid, lithium styrenesulfonate, sodium styrenesulfonate, vinyl benzoate, salts of vinyl benzoate, etc.

Examples of the monomer having an ionic group but not having an aromatic ring include vinylsulfonic acid, lithium vinylsulfonate, sodium vinylsulfonate, acrylic acid, sodium acrylate, lithium acrylate, methacrylic acid, sodium methacrylate, lithium methacrylate, etc.

Examples of the monomer having an aromatic ring but not having an ionic group include styrene, benzyl acrylate, benzyl methacrylate, etc.

Specific examples of the polymer that contains a structural unit derived from such a monomer include styrene-vinylsulfonic acid copolymer, styrene-sodium vinylsulfonate copolymer, styrene-lithium vinylsulfonate copolymer, polystyrenesulfonic acid, lithium polystyrenesulfonate, sodium polystyrenesulfonate, styrene-styrenesulfonic acid copolymer, styrene-lithium styrenesulfonate copolymer, styrene-sodium styrenesulfonate copolymer, polyvinylbenzoic acid, lithium polyvinylbenzoate, sodium polyvinylbenzoate, styrene-vinylbenzoic acid copolymer, styrene-lithium vinylbenzoate copolymer, styrene-sodium vinylbenzoate copolymer, etc.

Above all, from the viewpoint of effectively inhibiting gas generation, preferred are polystyrenesulfonic acid, lithium polystyrenesulfonate, sodium polystyrenesulfonate, styrene-styrenesulfonic acid copolymer, styrene-lithium styrenesulfonate copolymer, styrene-sodium styrenesulfonate copolymer, polyvinylbenzoic acid, lithium polyvinylbenzoate, sodium polyvinylbenzoate, styrene-vinylbenzoic acid copolymer, styrene-lithium vinylbenzoate copolymer and styrene-sodium vinylbenzoate copolymer.

Further, more preferred are polystyrenesulfonic acid, lithium polystyrenesulfonate, sodium polystyrenesulfonate, styrene-lithium styrenesulfonate copolymer and styrene-sodium styrenesulfonate copolymer; and even more preferred are lithium polystyrenesulfonate, sodium polystyrenesulfonate, styrene-lithium styrenesulfonate and styrene-sodium styrenesulfonate.

Not specifically defined, the weight-average molecular weight of the polymer (b3) is generally at least 200, preferably at least 1000, more preferably at least 2000, even more preferably at least 2500. On the other hand, the weight-average molecular weight is generally at most 1,000,000, preferably at most 500,000, more preferably at most 300,000, even more preferably at most 200,000.

(4. Structure (S))

The organic compound (B) in the present invention has at least one structure selected from a group consisting of a graft structure, a star structure and a three-dimensional network structure. Preferably, the structure (S) is formed of the crosslinking structure that the compound containing the organic compound (B1) and the organic compound (B2) has. The crosslinking mode is preferably any one of chemical crosslinking, physical crosslinking and ion complex crosslinking. From the viewpoint of high stability, more preferred is chemical crosslinking.

In this description, the graft structure indicates a molecule having one or more blocks in which the side chain in the molecule bonds to the main chain.

In this description, the star structure indicates a molecule in which multiple linear molecular chains start from the atom to be one branching point in the molecule.

In this description, the three-dimensional network structure indicates a molecule having a large number of highly-branched closed loops in one molecule. Of those structures (S), preferred is the three-dimensional network structure.

The above-mentioned structure (S) may be confirmed through small-angle X-ray scattering technique or viscoelastometry or through measurement of an insoluble content with a good solvent <Production Method for Negative Electrode Active Material for Nonaqueous Secondary Batteries>

The negative electrode active material for nonaqueous secondary batteries of the present invention is not specifically defined in point of the production method thereof so far as the active material contains the above-mentioned active material (A) and the organic compound (B) as the indispensable ingredients therein. More preferably, the organic compound (B) is a mixture and/or a reaction product of at least the basic group-having organic compound (B1) and the lithium ion-coordinating group-having organic compound (B2), and may further contain, as mixed therein and/or reacted therewith, the π-conjugated structure-having organic compound (B3) and any other component.

In this description, "containing the active material (A) and the organic compound (B)" is meant to include any of a condition where the active material (A) and the organic compound (B) are mixed, a condition where the organic compound (B) has adhered to the surface of the active material (A) and a condition where the inorganic compound (B) has adhered inside the pores of the active material (A), irrespective of the relationship of the condition between the active material (A) and the organic compound (B).

The condition of the active material (A) and the organic compound (B) can be confirmed by observing the cross section of the particles of the negative electrode active material for nonaqueous secondary batteries, for example, according to a method of field emission scanning electron microscopy-energy dispersive X-ray analysis (SEM-EDX), X-ray photoelectron spectroscopy (XPS), etc. The confirmation method may be carried out at the time when the negative electrode active material for nonaqueous secondary batteries has been produced, or for the product of a negative electrode or a nonaqueous secondary batteries containing the negative electrode active material for nonaqueous secondary batteries of the present invention.

The negative electrode active material for nonaqueous secondary batteries of the present invention may be produced, for example, according to the method mentioned below.

The above-mentioned organic compound (B1) and the above-mentioned organic compound (B2) are added to an organic solvent, water or a mixed solvent thereof, then the resulting solution is mixed with the active material (A), and thereafter dried by heating and/or under reduced pressure to give a negative electrode active material for nonaqueous secondary batteries containing the active material (A) and the organic compound (B).

For example, a solution of the organic compound (B1) and a solution of the organic compound (B2) may be prepared separately, or the organic compound (B1) and the organic compound (B2) may be added to one and the same solvent to prepare a solution thereof. From the viewpoint of the initial charge/discharge efficiency of lithium ion secondary batteries, it is desirable that a solution of the organic compound (B1) and a solution of the organic compound (B2) are prepared separately.

Not specifically defined, the solvent to be used may be any one in which the organic compound (B1) and the organic compound (B2) can dissolve, and preferred are water, ethyl methyl ketone, toluene, acetone, methyl isobutyl ketone, ethanol, methanol, etc. Above all, more preferred are water, ethyl methyl ketone, acetone, methyl isobutyl ketone, ethanol and methanol from the viewpoint of the cost and the easiness in drying.

In case where a solution of the organic compound (B1) and a solution of the organic compound (B2) are prepared separately, these solution may be mixed with the active material (A) all at a time; or the solutions may be mixed first and the active material (A) may be mixed thereinto; or the active material (A) may be mixed first in any of the solution or the organic compound (B1) or the solution of the organic compound (B2) and thereafter the other solution may be mixed thereinto.

Preferably, in preparing the slurry of the active material (A) dispersed therein, a solution of the organic compound (B1) and a solution of the organic compound (B2) are added thereto. This is because, after the negative electrode active material for nonaqueous secondary batteries has been applied to a negative electrode plate, the solvent of the organic compound (B1) and that of the organic compound (B2) may be removed by drying to secure the effect of improving the initial charge/discharge efficiency and the effect of preventing the gas generation, or that is, the production process can be simplified.

The slurry of the active material (A) dispersed therein is one embodiment that is formed in the process of applying the negative electrode active material for nonaqueous secondary batteries of the present invention onto the surface of a negative electrode for producing a negative electrode for nonaqueous secondary batteries.

Above all, form the viewpoint of the initial charge/discharge efficiency, it is desirable that a solution of the organic compound (B1) and a solution of the organic compound (B2) are separately prepared and these solutions are mixed with the active substance (A) all at a time to prepare a slurry of the active material (A) dispersed therein. In addition, from the viewpoint that the surface of the active material (A) can be uniformly coated, it is more desirable that a solution of the organic compound (B1), a solution of the organic compound (B2) and the active material (A) are mixed all at a time, then the resulting mixture is filtered or dried, and thereafter the organic compound (B3) is mixed therein.

In mixing with the active material (A), the concentration of the organic compound (B1) or the organic compound (B2) in the solvent is generally from 0.01% by mass to 70% by mass. Falling within the range, it is expected that the organic compound (B1) and the organic compound (B2) can uniformly exist in the surface of the active material (A) in the negative electrode active material for nonaqueous secondary batteries to efficiently secure the advantageous effects thereof.

The concentration of the organic compound (B1) or the organic compound (B2) in the solution is preferably at least 0.03% by mass, more preferably at least 0.05% by mass, and is preferably at most 60% by mass, more preferably at most 40% by mass.

The above-mentioned solution concentration is the concentration of the solution in contact thereof with the active material (A), and in case where the solution of the organic compound (B1) and the solution of the organic compound (B2) are mixed with the active material all at a time or in case where these solutions are mixed and thereafter mixed with the active material (A), it means the concentration of the organic compound (B) that is the total of the organic compound (B1) and the organic compound (B2). On the other hand, in case where the active material (A) is mixed with any of the solution of the organic compound (B1) or the solution of the organic compound (B2) and thereafter the other solution is added thereto, that concentration means the concentration of the solution of the organic compound (B1) or the concentration of the solution of the organic compound (B2).

The amount of the organic compound (B1) and the organic compound (B2) to be added may be suitably controlled, and preferably, the amount thereof is so controlled as to be the preferred content of the compound in the negative electrode active material for nonaqueous secondary batteries of the present invention.

In case where the solution of the organic compound (B1) and/or the solution of the organic compound (B2) are/is dried by heating, the temperature is generally from 50° C. to 300° C. Falling within the range, the drying efficiency could be sufficient and the battery performance degradation owing to any residual solvent could be prevented and additional advantages are that the organic compound (B1) and the organic compound (B2) could be prevented from decomposing and the effect reduction owing to attenuation of the interaction between the active material (A) and the organic compound (B1) and the organic compound (B2) could be readily prevented.

The temperature is preferably 250° C. or lower, more preferably 100° C. or lower.

In case where the solution of the organic compound (B1) and/or the organic compound (B2) is dried through depressurization, the pressure is, as gauge pressure expression, generally at most 0 MPa and at least −0.2 MPa. Falling within the range, the drying can be carried out relatively efficiently. The pressure is preferably at most −0.03 MPa, and is preferably at least −0.15 MPa.

Prior to the drying, the solution containing the active material (A), the organic compound (B1) and the organic compound (B2) may be filtered. Accordingly, an effect of removing the organic compound (B1) and the organic compound (B2) not adhering to the active material (A) can be expected.

In case where the above-mentioned organic compound (B3) and any other component are contained in the negative electrode active material for nonaqueous secondary batteries of the present invention, these are added to an organic solvent, water or a mixed solvent thereof to give a solution thereof, like the organic compound (B1) and the organic compound (B2) to be therein, and the resulting solution is mixed with the active material (A) and then dried by heating and/or under reduced pressure.

In case where the organic compound (B3) and any other component are added, a solution of the other components may be prepared separately from the solution of the organic compound (B1) and the organic compound (B2), or they may be added to the same solvent as that for the solution of the organic compound (B1) and the organic compound (B2) to prepare the solution thereof.

<Content of Organic Compound (B)>

The negative electrode active material for nonaqueous secondary batteries of the present invention is not specifically defined so far as it contains the active material (A) and the organic compound (B). The content of the organic compound (B) may be at least 0.01% by mass relative to the active material (A), may be at most 10% by mass. In case where the organic compound (B) is a high-molecular compound of the polymer (b), the content of the polymer (b) relative to the active material (A) including the preferred range thereof is the same value as that of the organic compound (B).

Falling within the range, the trouble of delay of the charging speed owing to the increase in the negative electrode resistance as well as the trouble of impossibility of charge/discharge could be readily evaded, and further, the effect of reducing the specific surface area of the carbon material owing to addition of the organic compound (B) could be satisfactory and therefore good cycle characteristics and charge speed can be readily attained.

The content of the organic compound (B) is, relative to the active material (A), preferably at least 0.05% by mass, more preferably at least 0.1% by mass, and is preferably at most 8% by mass, more preferably at most 5% by mass, even more preferably at most 3% by mass, still more preferably at most 1% by mass, further more preferably at most 0.5% by mass, most preferably at most 0.2% by mass.

The content of the organic compound (B) is, when the solution containing the organic compound (B) is dried in production, to be in principle the amount of the organic compound (B) added during production, and for example, in case where the organic compound (B) not adhering to the unfiltered active material (A) is removed, the content can be calculated through weight reduction in TG-DTA analysis of obtained carbon material or from the amount of the organic compound (B) contained in the filtrate.

The negative electrode active material for nonaqueous secondary batteries of the present invention may contain any optional organic compound except the organic compound (B). The type of the optional organic compound is not specifically defined, but preferred is a polymer as securing stable adsorption thereof to the active material (A). More preferred is a polyanionic organic compound from the viewpoint of the ability thereof to form the interaction with the basic group-having organic compound (B1).

The content of the optional organic compound is not specifically defined, but is preferably from 0.01% by mass to 10% by mass relative to the active material (A).

Preferably, the negative electrode active material for nonaqueous secondary batteries of the present invention has the physical properties mentioned below.

The mean particle size (d50) of the negative electrode active material for nonaqueous secondary batteries of the present invention may be generally at most 50 μm and may be generally at least 1 μm. Falling within the range can prevent process disadvantages such as striation in production of negative electrode plates, and on the other hand, it is easy to control the surface area of the electrode plate to fall within a suitable range and to control the activity thereof with electrolytic solution.

The mean particle size (d50) is preferably at most 30 μm, more preferably at most 25 μm, and is preferably at least 4 μm, more preferably at least 10 μm.

The specific surface area of the negative electrode active material for nonaqueous secondary batteries of the present invention, as measured according to the BET method, is generally at least 1 $m^2/g$ and also is generally at most 11 $m^2/g$. Falling within the range could secure a sufficient site where Li ions move in and out and therefore could secure good high-speed charge/discharge characteristics and output characteristics, and accordingly, the activity of the active material to electrolytic solution can be readily controlled to reduce the initial irreversible capacity for providing high-capacity batteries.

The specific surface area is preferably 1.2 $m^2/g$ or more, more preferably 1.5 $m^2/g$, and is preferably 10 $m^2/g$ or less, more preferably 9 $m^2/g$ or less, even more preferably 8 $m^2/g$ or less.

The elution of the organic compound (B) in the negative electrode active material for nonaqueous secondary batteries of the present invention can be evaluated by immersing the carbon material in a salt-free nonaqueous solvent at room temperature (25° C.) for 5 hours and measuring the elution amount of the organic compound (B) in the solution.

The elution amount can be at most 20% by mass of the total amount of the organic compound (B) contained in the negative electrode active material for nonaqueous secondary batteries, and is preferably at most 15% by mass, even more preferably at most 10% by mass. From the viewpoint of the strength of the electrode plate, the amount is especially preferably at most 5% by mass.

The nonaqueous solvent to be used in elution evaluation as mentioned above may be suitably selected from nonaqueous solvents known as solvents for nonaqueous electrolytic solutions. For example, there are mentioned linear carbonates such as diethyl carbonate, dimethyl carbonate, ethylmethyl carbonate, etc.; cyclic carbonates such as ethylene carbonate, propylene carbonate, butylene carbonate, etc.; linear ethers such as 1,2-dimethoxyethane, etc.; cyclic ethers such as tetrahydrofuran, 2-methyltetrahydrofuran, sulfolane, 1,3-dioxolane, etc.; linear esters such as methyl formate, methyl acetate, methyl propionate, etc.; cyclic esters such as γ-butyrolactone, γ-valerolactone, etc.

One alone or two or more types of nonaqueous solvents may be used here either singly or as combined. In case of the mixed solvent, preferred is a combination of a mixed solvent containing a cyclic carbonate and a linear carbonate, in which, more preferably, the cyclic carbonate is ethylene carbonate.

Regarding the amount of quantitative determination of the elution amount of the organic compound (B), there is mentioned a method comprising immersing the negative electrode active material for nonaqueous secondary batteries in a nonaqueous solvent component, then collecting the supernatant, drying it to remove the solvent and analyzing the residue through NMR or GPC, in which the ratio of the peak intensity for the eluted component relative to the peak intensity for 100% elution is calculated.

<Negative Electrode for Nonaqueous Secondary Batteries>

The present invention also relates to a negative electrode for nonaqueous secondary batteries that is formed using the negative electrode active material for nonaqueous secondary batteries of the present invention, and for example, there is mentioned a negative electrode for lithium ion secondary batteries.

The production method for the negative electrode for nonaqueous secondary batteries and the selection of the other materials than the negative electrode active material for nonaqueous secondary batteries of the present invention to constitute the negative electrode for nonaqueous secondary batteries are not specifically defined.

The negative electrode for nonaqueous secondary batteries of the present invention comprises a collector and an active material layer formed on the collector, in which the active material layer contains at least the negative electrode active material for nonaqueous secondary batteries of the present invention. Preferably, the active material layer further contains a binder.

Not specifically defined, the binder is preferably one having an olefinic unsaturated bond in the molecule. Its specific examples include styrene-butadiene rubber, styrene-isoprene-styrene rubber, acrylonitrile-butadiene rubber, butadiene rubber, ethylene-propylene-diene copolymer, etc.

Using the binder of the type having an olefinic unsaturated bond, the swellability of the active material layer in electrolytic solution can be reduced. Above all, preferred is styrene-butadiene rubber as easily available.

Combining the binder of the type having an olefinic unsaturated bond in the molecule with the negative electrode active material for nonaqueous secondary batteries of the present invention enhances the mechanical strength of negative electrode plates. Negative electrode plates having a high mechanical strength can be prevented from being deteriorated through charge/discharge and therefore can have a long cycle life.

The binder having an olefinic unsaturated bond in the molecule is preferably one having a large molecular weight and/or a high unsaturated bond proportion.

The molecular weight of the binder is, as the weight-average molecular weight thereof, generally 10,000 or more and 1,000,000 or less. Within the range, both the mechanical strength and the flexibility of negative electrode plates can be controlled to be good. The weight-average molecular weight is preferably at least 50,000 and is preferably at most 300,000.

The proportion of the olefinic unsaturated bond in the molecule of the binder is, as the molar number of the olefinic unsaturated bond per gram of the total binder, generally $2.5 \times 10^{-7}$ mol or more, and is generally $5 \times 10^{-6}$ mol or less. Falling within the range, the strength improving effect is sufficient and the flexibility is also good. The molar number is preferably $8\times10^{-7}$ mols or more and is preferably $1\times10^{-6}$ mols or less.

The degree of unsaturation of the binder having an olefinic unsaturated bond is generally from 15% to 90%. The degree of unsaturation is preferably at least 20%, more preferably at least 40%, and is preferably at most 80%. In this description, the degree of unsaturation is the proportion (%) of the unsaturated bonds relative to the recurring unit number in the polymer.

As the binder, one not having an olefinic unsaturated bond may also be usable here along with the above-mentioned, olefinic unsaturated bond-having binder. By combining a binder having an olefinic unsaturated bond in the molecule and a binder not having an olefinic unsaturated bond, the coatability can be expected to be improved.

The mixing ratio of the binder not having an olefinic unsaturated bond to the binder having an olefinic unsaturated bond may be generally at most 150% by mass relative to 100% by mass of the latter, for preventing the strength of the active material layer from lowering, preferably at most 120% by mass.

Preferably, the binder accounts for from 0.01% by mass to 3% by mass relative to the active material. When the amount is at least 0.01% by mass, then the electrode plate strength can be prevented from lowering. When the amount is at most 3% by mass, then resistance increase, electrolytic solution infiltration reduction and capacity reduction can be prevented.

Examples of the binder not having an olefinic unsaturated bond include tackifying polysaccharides such as methyl cellulose, carboxymethyl cellulose, starch, carrageenan, pullulan, guar gum, xanthan gum, etc.; polyethers such as polyethylene oxide, polypropylene oxide, etc.; vinyl alcohols such as polyvinyl alcohol, polyvinyl butyral, etc.; poly acids or metal salts of those polymers, such as polyacrylic acid, polymethacrylic acid, etc.; fluorine-containing polymers such as polyvinylidene fluoride, etc.; alkane polymers or their copolymers, such as polyethylene, polypropylene, etc.

A conductive assistant may be incorporated in the active material layer for increasing the electroconductivity of the negative electrode. The conductive agent is not specifically defined, including carbon black such as acetylene black, ketjen black, furnace black, etc.; fine powder of Cu, Ni or an alloy thereof having a mean particle size of at most 1 µm, etc.

The amount of the conductive assistant is preferably at most 10% by mass relative to the negative electrode active material for nonaqueous secondary batteries of the present invention.

The negative electrode for nonaqueous secondary batteries of the present invention can be formed by dispersing the negative electrode active material for nonaqueous secondary batteries of the present invention and optionally a binder and/or a conductive assistant in a dispersion medium to give a slurry, followed by applying it onto a collector and drying it thereon. The dispersion medium may be an organic solvent such as alcohol or the like, or water.

The collector to be coated with the slurry is not specifically defined, and may be any known one. Concretely, there are mentioned metal thin films such as rolled copper foil, electrolytic copper foil, stainless foil, etc.

The thickness of the collector may be generally at least 4 µm, and may be generally at most 30 µm. The thickness is preferably at least 6 µm and is preferably at most 20 µm.

The thickness of the negative electrode active material layer for nonaqueous secondary batteries formed by slurry coating and drying (hereinafter this may be simply referred to as "active material layer") may be generally at least 5 µm from the viewpoint of the practicability as negative electrode and from the viewpoint of the function of sufficient lithium ion absorption/release relative to high-density current level, and may be generally at most 200 µm. Preferably, the thickness is at least 20 µm, more preferably at least 30 µm, and is preferably at most 100 µm, more preferably at most 75

The thickness of the active material layer may be controlled to fall within the above range by pressing the layer after slurry coating and drying.

The density of the negative electrode active material for nonaqueous secondary batteries in the active material layer may vary depending on the use thereof, but for use where the input/output characteristics are considered to be important, such as those for in-car products, power tools or the like, the density is generally from 1.10 g/cm$^3$ to 1.65 g/cm$^3$.

Falling within the range, it could be possible to evade the problem of contact resistance increase between particles owing to a too low density, while on the other hand, it could also be possible to prevent the rate characteristics from worsening owing to a too high density.

The density is preferably at least 1.20 g/cm$^3$, more preferably at least 1.25 g/cm$^3$.

On the other hand, for use where the capacity is considered to be important, for example, for mobile appliances such as portable phones or personal computers, the density of the active material layer is generally 1.45 g/cm$^3$ or more and is generally 1.90 g/cm$^3$ or less.

Falling within the range, a trouble of battery capacity reduction per unit volume owing to a too low density could be evaded; while on the other hand, it could also be possible to prevent the rate characteristics from worsening owing to a too high density.

The density is preferably at least 1.55 g/cm$^3$, more preferably at least 1.65 g/cm$^3$, even more preferably at least 1.7 g/cm$^3$.

<Nonaqueous Secondary Battery>

The basic configuration of the nonaqueous secondary battery of the present invention may be the same as that of any conventionally-known nonaqueous secondary battery and, in general, comprises a positive electrode and a negative electrode capable of absorbing/releasing lithium ions, and an electrolyte, in which the negative electrode is the negative electrode for nonaqueous secondary batteries of the present invention.

<Positive Electrode>

The positive electrode may comprise a collector and an active material layer formed on the collector. The active material layer preferably contains a binder in addition to the positive electrode active material therein.

The positive electrode active material includes metal chalcogen compounds capable of absorbing/releasing alkali metal cations such as lithium ions or the like during charging/discharging. Above all, preferred are metal chalcogen compounds capable of absorbing/releasing lithium ions.

The metal chalcogen compounds include transition metal oxides such as vanadium oxides, molybdenum oxides, manganese oxides, chromium oxides, titanium oxides, tungsten oxides, etc.; transition metal sulfides such as vanadium sulfides, molybdenum sulfides, titanium sulfides, CuS, etc.; transition metal phosphorus/sulfur compounds such as NiPS$_3$, FePS$_3$, etc.; transition metal selenium compounds such as VSe$_2$, NbSe$_3$, etc.; transition metal composite oxides such as $Fe_{0.25}V_{0.75}S_2$, $Na_{0.1}CrS_2$, etc.; transition metal composite sulfides such as $LiCoS_2$, $LiNiS_2$, etc.

Above all, preferred are $V_2O_5$, $V_5O_{13}$, $VO_2$, $Cr_2O_5$, $MnO_2$, $TiO_2$, $MoV_2O_8$, $LiCoO_2$, $LiNiO_2$, $LiMn_2O_4$, $TiS_2$, $V_2S_5$, $Cr_{0.25}V_{0.75}S_2$ and $Cr_{0.5}V_{0.5}S_2$ from the viewpoint of absorption/release of lithium ions; and more preferred are $LiCoO_2$, $LiNiO_2$, $LiMn_2O_4$, and lithium transition metal composite oxides derived from those by partly substituting the transition metal therein with any other metal.

One alone or two or more of these positive electrode active materials may be used here either singly or as mixed.

Not specifically defined, the binder for the positive electrode may be selected from any known one. For example, there are mentioned inorganic compounds such as silicates, water glass, etc.; resins not having an unsaturated bond such as Teflon (registered trademark), polyvinylidene fluoride, etc. Above all, preferred are resins not having an unsaturated bond as being hardly decomposed during oxidation reaction.

The weight-average molecular weight of the binder is generally at least 10,000 and is generally at most 3,000,000. The weight-average molecular weight is preferably at least 100,000, and is preferably at most 1,000,000.

A conductive assistant may be incorporated in the positive electrode active material layer for increasing the electroconductivity of positive electrodes. The conductive assistant is not specifically defined, including carbon powders of acetylene black, carbon black, graphite or the like, and various metal fibers, powders, foils, etc.

In the same manner as that of the production method for negative electrodes mentioned above, the positive electrode in the present invention may be produced by dispersing the active material and optionally a binder and/or a conductive assistant in a dispersion medium to give a slurry, then applying the slurry onto the surface of a collector and drying it thereon. The collector for the positive electrode is not specifically defined, and its examples include aluminium, nickel, stainless steel (SUS), etc.

<Electrolyte>

The electrolyte (this may be referred to as "electrolytic solution") is not specifically defined. There are mentioned a nonaqueous electrolytic solution prepared by dissolving a lithium salt as the electrolyte in a nonaqueous solvent, and gel-like, rubbery or solid sheet-like electrolytes prepared by adding an organic polymer compound or the like to the nonaqueous electrolytic solution.

The nonaqueous solvent for use in the nonaqueous electrolytic solution is not specifically defined, for which employable is any known nonaqueous solvent.

For example, there are mentioned linear carbonates such as diethyl carbonate, dimethyl carbonate, ethylmethyl carbonate, etc.; cyclic carbonates such as ethylene carbonate, propylene carbonate, butylene carbonate, etc.; linear ethers such as 1,2-dimethoxyethane, etc.; cyclic ethers such as tetrahydrofuran, 2-methyltetrahydrofuran, sulfolane, 1,3-dioxolane, etc.; linear esters such as methyl formate, methyl acetate, methyl propionate, etc.; cyclic esters such as γ-butyrolactone, γ-valerolactone, etc.

One alone or two or more types of nonaqueous solvents may be used here either singly or as combined. In case of the mixed solvent, preferred is a combination of a mixed solvent containing a cyclic carbonate and a linear carbonate from the viewpoint of the balance between electroconductivity and viscosity, in which, more preferably, the cyclic carbonate is ethylene carbonate.

The lithium salt for use in the nonaqueous electrolytic solution is not also specifically defined, for which employable is any known lithium salt. For example, there are mentioned halides such as LiCl, LiBr, etc.; perhalogenates such as $LiClO_4$, $LiBrO_4$, $LiClO_4$, etc.; inorganic lithium salts such as inorganic fluorides such as $LiPF_6$, $LiBF_6$, $LiAsF_6$, etc.; perfluoroalkanesulfonates such as $LiCF_3SO_3$, $LiC_4F_9SO_3$, etc.; fluorine-containing organic lithium salts such as perfluoroalkanesulfonic acid imide salts such as Li trifluoromethanesulfonylamide (($CF_3SO_2)_2$NLi), etc. Above all, preferred are $LiClO_4$, $LiPF_6$ and $LiBF_4$.

One alone or two or more types of lithium salts may be used here either singly or as combined. The concentration of the lithium salt in the nonaqueous electrolytic solution may be within a range of from 0.5 mol/L to 2.0 mol/L.

In case where an organic polymer compound is incorporated in the above-mentioned nonaqueous electrolytic solution to give gel-like, rubbery or solid sheet-like electrolytes for use herein, specific examples of the organic polymer compound include polyether polymer compounds such as polyethylene oxide, polypropylene oxide, etc.; crosslinked polymers of polyether polymer compounds; vinyl alcohol polymer compounds such as polyvinyl alcohol, polyvinyl butyral, etc.; insolubilized products of vinyl alcohol polymer compounds; polyphosphagen; polysiloxane; vinyl polymer compounds such as polyvinyl pyrrolidone, polyvinylidene carbonate, polyacrylonitrile, etc.; polymer copolymers such as poly(ω-methoxyoligoxyethylene methacrylate), poly(ω-methoxyoligoxyethylene methacrylate-co-methyl methacrylate), poly(hexafluoropropylene-vinylidene fluoride), etc.

The above-mentioned nonaqueous electrolytic solution may further contain a film-forming agent.

Specific examples of the film-forming agent include carbonate compounds such as vinylene carbonate, vinylethyl carbonate, methylphenyl carbonate, etc.; alkene sulfides such as ethylene sulfide, propylene sulfide, etc.; sultone compounds such as 1,3-propanesultone, 1,4-butanesultone, etc.; acid anhydrides such as maleic anhydride, succinic anhydride, etc.

An overcharge inhibitor such as diphenyl ether, cyclohexylbenzene or the like may be further added to the nonaqueous electrolytic solution.

In case where the above-mentioned various additives are used, the total content of the additives may be generally at most 10% by mass relative to the whole of the nonaqueous electrolytic solution in order not to have any negative influence on the other battery characteristics, for example, in order not to increase the initial irreversible capacity and not to worsen the low-temperature characteristics and the rate characteristics of batteries. In particular, the content is preferably at most 8% by mass, more preferably at most 5% by mass, even more preferably at most 2% by mass.

As the electrolyte, also usable here is a polymer solid electrolyte of a conductor for alkali metal cations such as lithium ions, etc.

As the polymer solid electrolyte, there are mentioned those prepared by dissolving an Li salt in the above-mentioned polyether polymer compound and polymers in which the terminal hydroxyl group of polyether is substituted with an alkoxide.

<Others>

In general, a porous separator of a porous film, a nonwoven fabric or the like may be put between the positive electrode and the negative electrode for preventing short-circuiting between the electrodes, and conveniently, the nonaqueous electrolytic solution is infiltrated in the porous separator. As the material of the separator, usable here are polyolefins such as polyethylene, polypropylene, etc.; polyether sulfones, etc. Preferred are polyolefins.

Regarding the shape of the nonaqueous secondary battery, for example, there are mentioned cylinder-type batteries in which sheet electrodes and a separator are kept spiral; inside-out structure cylinder-type batteries in which pellet electrodes and a separator are combined; coin-type batteries in which pellet electrodes and a separator are laminated, etc. The battery having the shape as above may be housed in a housing case to give coin-type, cylindrical, square or any other batteries having any desired shape and size.

The process of constructing the nonaqueous secondary battery is not also specifically defined. The battery can be constructed in any process in accordance with the configuration thereof. For example, a negative electrode is put on a housing case, then an electrolytic solution and a separator are provided thereon, a positive electrode is further put thereon so as to face the negative electrode, and these are swaged along with a gasket and a sealing plate to give a battery.

<Battery Performance>

The nonaqueous secondary battery produced in the manner as above exhibits the performance mentioned below.

The initial charge/discharge efficiency of the nonaqueous secondary battery of the present invention can be generally at least 80%. When the initial charge/discharge efficiency is too low, then it may worsen cycle characteristics and may cause gas generation. Of the nonaqueous secondary battery of the present invention, the initial charge/discharge efficiency is preferably at least 85%, more preferably at least 90%.

In this description, the initial charge/discharge efficiency is calculated according to the formula mentioned below, in which the charge capacity and the discharge capacity are obtained from the current capacity at the 2nd, 3rd and 4th cycles in the charge/discharge program shown in the following Table.

Initial Charge/Discharge Efficiency (%)=discharge capacity at 4th cycle/(discharge capacity at 4th cycle+capacity loss (=charge capacity−discharge capacity) at 2nd, 3rd and 4th cycles)×100(%)

TABLE 1

Evaluation Program for Coil Cell

| Cycle | 1 | 2 | 3 | 4 |
|---|---|---|---|---|
| 1 | pause 24 h | | | |
| 2 | CC-CV charge CC: 0.216 mA CV: 10 mV cutoff condition: 350 mAh/g | pause 10 min | CC discharge CC: 0.432 mA cutoff condition: 1500 mV | pause 10 min |
| 3 | CC-CV charge CC: 0.216 mA CV: 5 mV cutoff condition: 0.02 mA | pause 10 min | CC discharge CC: 0.432 mA cutoff condition: 1500 mV | pause 10 min |
| 4 | CC-CV charge CC: 0.216 mA CV: 5 mV cutoff condition: 0.02 mA | pause 10 min | CC discharge CC: 0.432 mA cutoff condition: 1500 mV | pause 10 min |
| 5 | pause 10 min | | | |

In the Table, "CC-CV charge" means a cycle of constant charge at a constant current followed by charge at a constant voltage to reach the cutoff condition. "CC discharge" indicates discharge at a constant current to reach the cutoff condition.

Of the nonaqueous secondary battery of the present invention, the capacity loss can be generally at most 35.0 mAh/g. When the capacity loss is too large, then the cycle characteristics may worsen.

Of the nonaqueous secondary battery of the present invention, the capacity loss is preferably at most 32.0 mAh/g, more preferably at most 31.5 mAh/g, even more preferably 30 mAh/g, most preferably at most 28.0 mAh/g.

In this description, the capacity loss is calculated according to the formula mentioned below, in which the charge capacity and the discharge capacity are obtained from the current capacity at the 2nd, 3rd and 4th cycles in the charge/discharge program shown in the above-mentioned Table.

Capacity Loss (mAh/g)=2nd cycle (charge capacity−discharge capacity)+3rd cycle (charge capacity−discharge capacity)+4th cycle (charge capacity−discharge capacity)

Of the nonaqueous secondary battery of the present invention, the negative electrode resistance can be generally at most 24.5Ω. When the negative electrode resistance is too large, then the charge/discharge rate tends to be low. Of the nonaqueous secondary battery of the present invention, the negative electrode resistance is preferably at most 20.0Ω, more preferably at most 15Ω, most preferably at most 12Ω. As described below, the negative electrode resistance can be obtained according to a known method. Concretely, a coin cell battery is produced, a Cole-Cole plot is formed from the result of impedance measurement, and the diameter of the arc appearing in the plot is read to be the interfacial resistance value.

EXAMPLES

Embodiments of the present invention are described in more detail with reference to the following Examples; however, the present invention is not restricted by these Examples.

The mean particle size (d50) mentioned below was measured as follows: 0.01 g of a sample was suspended in 10 ml of an aqueous 0.2 mass % solution of a surfactant, polyoxyethylene sorbitan monolaurate, then introduced into a laser diffraction/scattering particle sizer (trade name: HORIBA's LA-920), and irradiated with 28-kHz ultrasonic waves at an output of 60 W for 1 minute. In the measuring apparatus, the volume-based median size was measured to be the mean particle size of the sample.

Example 1

(1) Preparation of Negative Electrode Active Material A for Nonaqueous Secondary Batteries As the active material (A), used was spheronized natural graphite (mean particle size (d50) 17 μm). The graphite and, as the organic compound (B1), a methyl ethyl ketone solution (prepared by adding 48.125 g of methyl ethyl ketone to 1.875 g of Nittobo's PAA-03-E (polyallylamine, weight-average molecular weight 3000, 20% ethanol solution) for dilution) and, as the organic compound (B2), a methyl ethyl ketone solution (prepared by adding 49.875 g of methyl ethyl ketone to 0.125 g of NOF's Epiol E-400 (polyoxyethylene glycol diglycidyl ether, number of oxyethylene groups 9) for dilution) were put into a flask and stirred. In this, the ratio by mass of the organic compound (B1) to the organic compound (B2) was 3/1. Subsequently, the solvent was evaporated away by heating to give a powdery, negative electrode active material A for nonaqueous secondary batteries.

In the same manner as in Example 1 but not adding the active material (A), the solvent was evaporated away by heating. As a result, the form was a gel-like one, and the NMR analysis confirmed epoxy and amine bonds. As hardly soluble in the organic solvent that is generally used for dissolving monomer, the product was confirmed to have a chemically-crosslinked three-dimensional network structure.

Next, a coin cell was produced according to the following process and evaluated for charge/discharge performance thereof.

(1) Slurry Preparation 20 g of the negative electrode active material A for nonaqueous secondary batteries, and 20.2 g of an aqueous solution of carboxymethyl cellulose (1% by mass) were mixed, and kneaded with a kneading machine (Awatori Neritaro, by Thinky Corporation) (rotation: 2000 rpm, 5 minutes; defoaming: 2200 rpm, 1 min), and 0.5 g of an aqueous dispersion of styrene-butadiene rubber (SBR) (40% by mass) was added thereto and again kneaded under the same condition as above to prepare a negative electrode active material slurry A.

(2) Electrode Plate Production

A copper foil (thickness 18 μm) was put on Tester Sangyo's Auto Film Applicator, and adsorbed thereto under negative pressure. A suitable amount of the negative electrode active material slurry A was put on the copper foil, and the Tester Sangyo's Auto Film Applicator (gap 255 μm) was swept at a rate of 10 mm/sec so that the copper foil was coated with the slurry A.

The copper foil coated with the negative electrode active material slurry A was dried in an inert oven (EPEC-75, by Isuzu Manufacturing) to give an electrode plate A' (90° C., 50 minutes, nitrogen stream 10 L/min).

Subsequently, the electrode plate A' was led to pass through a pressing machine (3-ton mechanical precision roll press) to give an electrode plate A with the active material layer therein compressed. The part of the copper foil coated with the negative electrode active material slurry was blanked out with a blanking punch (φ12.5 mm, SNG, by NOGAMIGIKEN), and the weight was measured and the thickness thereof was measured with a thickness meter (IDS-112, by Mitsutoyo). The weight per unit area thereof and the density of the active material layer were calculated.

(3) Production of Coin Cell

The electrode plate A produced according to the method mentioned above was blanked out into a disc electrode having a diameter of 12.5 mm. A lithium metal foil was blanked out into a disc having a diameter of 14 mm to be a counter electrode. Between the two electrodes, there was arranged a separator (formed of a porous polyethylene film) infiltrated with an electrolytic solution, thereby producing a 2016 coin-type battery (coin cell) using the above-mentioned electrolytic solution. The electrolytic solution used here was prepared by dissolving $LiPF_6$ in a mixed solution of ethylene carbonate/dimethyl carbonate/ethylmethyl carbonate=15/80/5 (by volume) to be 1.2 mol/L therein.

All the operation was carried out in a globe box (OMNI-LAB, by Vacuum Atmospheres, filled with Ar and having an oxygen concentration of at most 0.2 ppm and a moisture concentration of 0.5 ppm). Before brought into the globe box, the members and others for the coin cell were dried with a vacuum drier (Vos-451SD, by TOKYO RIKAKIKAI) for 12 hours or more.

(4) Charge/Discharge Evaluation of Coin Cell

According to the charge/discharge program shown in the above-mentioned Table 1, the cell was tested fro charge/discharge evaluation.

The initial charge/discharge efficiency (%) was calculated according to the following formula.

Initial Charge/Discharge Efficiency (%)=discharge capacity at 4th cycle/(discharge capacity at 4th cycle+capacity loss (=charge capacity−discharge capacity) at 2nd, 3rd and 4th cycles)×100(%)

Capacity Loss (mAh/g)=2nd cycle (charge capacity−discharge capacity)+3rd cycle (charge capacity−discharge capacity)+4th cycle (charge capacity−discharge capacity)

The negative electrode resistance was measured as follows.

Using the electrode of the coin cell battery that had been tested for the charge/discharge test according to the charge/discharge program shown in Table 1, the impedance was measured. From the found data, the Cole-Cole plot was formed, and the diameter of the arc appearing in the plot was read to be the interfacial resistance value.

Example 2

A powdery, negative electrode active material B for nonaqueous secondary batteries was prepared in the same manner as in Example 1, except that the methyl ethyl ketone solution as the organic compound (B1) was changed to one prepared by adding 49.0625 g of methyl ethyl ketone to 0.9375 g of a 20% ethanol solution of Nittobo's PAA-03-E for dilution and that the methyl ethyl ketone solution as the organic compound (B2) was changed to one prepared by adding 49.9375 g of methyl ethyl ketone to 0.0625 g of NOF's Epiol E-400 for dilution. Also according to the same process as in Example 1, an electrode plate B was produced and tested for coin cell charge/discharge evaluation.

Example 3

A powdery, negative electrode active material C for nonaqueous secondary batteries was prepared in the same manner as in Example 1, except that the methyl ethyl ketone solution as the organic compound (B1) was changed to one prepared by adding 49.625 g of methyl ethyl ketone to 0.375 g of a 20% ethanol solution of Nittobo's PAA-03-E for dilution and that the methyl ethyl ketone solution as the organic compound (B2) was changed to one prepared by adding 49.975 g of methyl ethyl ketone to 0.025 g of NOF's Epiol E-400 for dilution. Also according to the same process as in Example 1, an electrode plate C was produced and tested for coin cell charge/discharge evaluation.

Example 4

A powdery, negative electrode active material D for nonaqueous secondary batteries was prepared in the same manner as in Example 1, except that the methyl ethyl ketone solution as the organic compound (B1) was changed to one prepared by adding 49.8125 g of methyl ethyl ketone to 0.1875 g of a 20% ethanol solution of Nittobo's PAA-03-E for dilution and that the methyl ethyl ketone solution as the organic compound (B2) was changed to one prepared by adding 49.9875 g of methyl ethyl ketone to 0.0125 g of NOF's Epiol E-400 for dilution. Also according to the same process as in Example 1, an electrode plate D was produced and tested for coin cell charge/discharge evaluation.

Example 5

As the organic compound (B1), a methyl ethyl ketone solution (prepared by adding 24.625 g of methyl ethyl ketone to 0.375 g of Nittobo's PAA-03-E (polyallylamine, weight-average molecular weight 3000, 20% ethanol solution) for dilution), and as the organic compound (B2), a methyl ethyl ketone solution (prepared by adding 24.975 g of methyl ethyl ketone to 0.025 g of NOF's Epiol E-400 (polyoxyethylene glycol diglycidyl ether, number of oxyethylene groups 9) for dilution) were put into a flask, heated up to 70° C. and stirred for 2 hours, whereby the organic compound (B1) was reacted with the organic compound (B2). Subsequently, as the active material (A), spheronized natural graphite (mean particle size (d50) 17 µm) particles (50 g) were added thereto and stirred at the above-mentioned temperature with removing the solvent through evaporation, thereby giving a powdery, negative electrode active material E for nonaqueous secondary batteries. After this, an electrode plate E was produced according to the same process as in Example 1, and tested for coin cell charge/discharge evaluation.

Example 6

A powdery, negative electrode active material F for nonaqueous secondary batteries was prepared in the same manner as in Example 1, except that, as the organic compound (B1), used was one prepared by adding 49.625 g of water to 0.375 g of an aqueous 20% solution of Dia-Nitrix's polyvinyl alcohol (item code 0595B) for dilution and that, as the organic compound (B2), used was one prepared by adding 49.975 g of water to 0.025 g of NOF's Epiol E-400 for dilution. Also according to the same process as in Example 1, an electrode plate F was produced and tested for coin cell charge/discharge evaluation.

Example 7

Spheronized natural graphite (mean particle size (d50) 17 µm) particles (50 g), and as the organic compound (B1), a methyl ethyl ketone solution (prepared by adding 49.625 g of methyl ethyl ketone to 0.375 g of Nittobo's PAA-03-E (polyallylamine, weight-average molecular weight 3000, 20% ethanol solution) for dilution), and as the organic compound (B2), a methyl ethyl ketone solution (prepared by adding 49.975 g of methyl ethyl ketone to 0.025 g of NOF's Epiol E-400 (polyoxyethylene glycol diglycidyl ether, number of oxyethylene groups 9) for dilution), and further as the organic compound (B3), an aqueous solution (prepared by adding 49.1667 g of distilled water to 0.8333 g of Aldrich's lithium polystyrenesulfonate (weight-average molecular weight: 75000, aqueous 30% solution) for dilution) were put into a flask and stirred. The solvent was evaporated away by heating to give a powdery, negative electrode active material G for nonaqueous secondary batteries. Also according to the same process as in Example 1, an electrode plate G was produced and tested for coin cell charge/discharge evaluation.

Comparative Example 1

An electrode plate H was produced according to the same process as in Example 1, except that the active material (A) of spheronized natural graphite (mean particle size (d50) 17 µm) particles alone was used without adding the organic compound (B1) and the organic compound (B2) thereto, and tested for coin cell charge/discharge evaluation.

Comparative Example 2

A powdery, negative electrode active material I for nonaqueous secondary batteries was produced in the same manner as in Example 1, except that, as the organic compound (B1), the methyl ethyl ketone solution was changed to one prepared by adding 47.5 g of methyl ethyl ketone to 2.5 g of a 20% ethanol solution of Nittobo's PAA-03-E for dilution, and that the organic compound (B2) was not added, and tested for coin cell charge/discharge evaluation.

Comparative Example 3

A powdery, negative electrode active material J for nonaqueous secondary batteries was produced in the same manner as in Example 1, except that, as the organic compound (B1), the methyl ethyl ketone solution was changed to one prepared by adding 48.7 g of methyl ethyl ketone to 1.25 g of a 20% ethanol solution of Nittobo's PAA-03-E for dilution, and that the organic compound (B2) was not added, and tested for coin cell charge/discharge evaluation.

Comparative Example 4

A powdery, negative electrode active material K for nonaqueous secondary batteries was produced in the same manner as in Example 1, except that, as the organic compound (B1), the methyl ethyl ketone solution was changed to one prepared by adding 47.5 g of methyl ethyl ketone to 0.25 g of a 20% ethanol solution of Nittobo's PAA-03-E for dilution, and that the organic compound (B2) was not added, and tested for coin cell charge/discharge evaluation.

The coin cell charge/discharge evaluation results in Examples 1 to 7 and Comparative Examples 1 to 4 are shown in Table 2 below.

TABLE 2

| | Negative Electrode Active Material for Nonaqueous Secondary Batteries | Amount of Organic Compound Layer (mass %, relative to negative electrode active material) | Initial Charge/ Discharge Efficiency (%) | Capacity Loss (mAh/g) | Resistance (Ω) |
|---|---|---|---|---|---|
| Example 1 | A | organic compound (B): 1 (breakdown: organic compound B1: 0.75 organic compound B2: 0.25) | 93.1 | 26.9 | 24.3 |

TABLE 2-continued

| | Negative Electrode Active Material for Nonaqueous Secondary Batteries | Amount of Organic Compound Layer (mass %, relative to negative electrode active material) | Initial Charge/ Discharge Efficiency (%) | Capacity Loss (mAh/g) | Resistance (Ω) |
|---|---|---|---|---|---|
| Example 2 | B | organic compound (B): 0.5 (breakdown: organic compound B1: 0.375 organic compound B2: 0.125) | 93.1 | 27.1 | 17.8 |
| Example 3 | C | organic compound (B): 0.2 (breakdown: organic compound B1: 0.15 organic compound B2: 0.05) | 92.3 | 30.3 | 11.7 |
| Example 4 | D | organic compound (B): 0.1 (breakdown: organic compound B1: 0.075 organic compound B2: 0.025) | 92.1 | 31.5 | 10.8 |
| Example 5 | E | organic compound (B): 0.2 (breakdown: organic compound B1: 0.15 organic compound B2: 0.05) | 92.0 | 32.0 | 20.7 |
| Example 6 | F | organic compound (B): 0.2 (breakdown: organic compound B1: 0.15 organic compound B2: 0.05) | 92.0 | 31.3 | — |
| Example 7 | G | organic compound (B): 0.7 (breakdown: organic compound B1: 0.15 organic compound B2: 0.05 organic compound B3: 0.5) | 94.0 | 23.1 | — |
| Comparative Example 1 | spheronized natural graphite | — | 91.0 | 36 | 11.4 |
| Comparative Example 2 | I | organic compound B1: 1 | 92.8 | 28.3 | 31.9 |
| Comparative Example 3 | J | organic compound B1: 0.5 | 92.5 | 29.3 | 19.9 |
| Comparative Example 4 | K | organic compound B1: 0.1 | 91.4 | 33.3 | 14.0 |

* "Amount of Organic Compound Layer (mass %, relative to negative electrode active material)" indicates the content of the organic compound (mass %) relative to the active material (A).

It is known that, as compared with the negative electrode active materials for nonaqueous secondary batteries of Comparative Examples 1, 2, 3 and 4, the negative electrode active materials for nonaqueous secondary batteries containing the active material (A) and the organic compound (B) (Examples 1 to 7) were improved in the initial charge/discharge efficiency (%) and the capacity loss reduced. From this, it is known that, owing to the effect of the organic compound (B), the surface of the active material was coated to prevent the reductive decomposition of electrolytic solution, and therefore the capacity loss was reduced and the gas generation was prevented.

While the invention has been described in detail with reference to specific examples thereof, it will be apparent to one skilled in the art that various changes and modifications can be made therein without departing from the spirit and scope thereof.

The present application is based on a Japanese patent application filed on Feb. 14, 2012 (Application No. 2012-029988), a Japanese patent application filed on Mar. 30, 2012 (Application No. 2012-080655), a Japanese patent application filed on May 16, 2012 (Application No. 2012-112317), a Japanese patent application filed on Jun. 22, 2012 (Application No. 2012-141100), a Japanese patent application filed on Jul. 27, 2012 (Application No. 2012-167659), a Japanese patent application filed on Aug. 22, 2012 (Application No. 2012-183037), a Japanese patent application filed on Dec. 18, 2012 (Application No. 2012-275819), a Japanese patent application filed on Dec. 18, 2012 (Application No. 2012-275820), and a Japanese patent application filed on Jan. 16, 2013 (Application No. 2013-005457), the contents of which are incorporated herein by reference.

INDUSTRIAL APPLICABILITY

The present inventors have found that the negative electrode active material for nonaqueous secondary batteries of the present invention can be used as the negative electrode active material in nonaqueous secondary batteries, and there can be obtained a well-balanced negative electrode material for nonaqueous secondary batteries which, while preventing increase in negative electrode resistance, can further improve the charge/discharge efficiency of batteries and can reduce the capacity loss accompanied by charge/discharge cycles.

Accordingly, the negative electrode active material for nonaqueous secondary batteries of the present invention is useful for nonaqueous secondary batteries for use where the input/output characteristics are considered to be important, such as those for in-car products, power tools or the like, and is, in addition, also useful for nonaqueous secondary batteries for use for mobile appliances where the capacity is considered to be important, such as those for mobile telephones and personal computers.

The invention claimed is:

1. A negative electrode active material for a nonaqueous secondary battery comprising:
   an active material (A) capable of occluding and releasing lithium ions, wherein said active material (A) is natural graphite; and
   an organic compound (B) adsorbed to a surface of the active material (A), wherein the organic compound (B) promotes the desolvation relative to the lithium ions having solvated with electrolytic solution;
   wherein
   the organic compound (B) is a polymer which comprises:
      at least one basic group selected from the group consisting of a primary amino group and a secondary amino group; and
      a lithium ion-coordinating group which comprises an oxyalkylene group, and
   wherein
   a structure (S) of the compound (B) comprises at least one structure selected from the group consisting of a graft structure, a star structure and a three-dimensional network structure, and the structure (S) is formed by crosslinking of the organic compound (B).

2. The negative electrode active material for a nonaqueous secondary battery according to claim 1, wherein a weight average molecular weight of the compound (B) is from 500 to 1,000,000 measured through gel permeation chromatography.

3. The negative electrode active material for a nonaqueous secondary battery according to claim 1, wherein the structure (S) comprises at least one crosslinking selected from the group consisting of chemical crosslinking, physical crosslinking and ion complex crosslinking.

4. The negative electrode active material for a nonaqueous secondary battery according to claim 1, wherein the organic compound (B) further comprises a π-conjugated structure.

5. The negative electrode active material for a nonaqueous secondary battery according to claim 4, wherein the π-conjugated structure is at least one selected from the group consisting of a benzene ring, a condensed aromatic ring and an aromatic hetero ring.

6. The negative electrode active material for a nonaqueous secondary battery according to claim 1, wherein the organic component (B) comprises
a reaction product of a polymer (b1) and a polymer (b2),
the polymer (b1) is at least one of a homopolymer and a copolymer of an ethylenic unsaturated group-containing amine,
the polymer (b2) is at least one polymer of formula (1), and
a content of the polymer (b2) relative to the polymer (b1) in the active material (A) is from 1% by mass to 300% by mass:

   (1)

wherein
$R^1$ and $R^2$ are each independently a hydrogen atom, an alkyl group, an aryl group, an aralkyl group, a glycidyl group or an epoxy group,
AO is an oxyalkylene group having from 2 to 5 carbon atoms, and
n is an integer of from 1 to 50, and
the reaction product of the polymers (b1) and (b2) comprises at least one of a graft structure, a star structure and a three-dimensional network structure.

7. The negative electrode active material for nonaqueous secondary batteries according to claim 6, wherein the polymer (b1) is:
a homopolymer of a monomer selected from the group consisting of vinylamine, allylamine, N-alkyl-substituted allylamine, N,N-dialkyl-substituted allylamine, diallylamine and N-alkyl-substituted diallylamine,
a copolymer of two or more of monomers selected from the group consisting of vinylamine, allylamine, N-allyl-substituted allylamine, N,N-dialkyl-substituted allylamine, diallylamine and N-alkyl-substituted diallylamine, or
a copolymer of (i) one or more of monomers selected from the group consisting of vinylamine, allylamine, N-alkyl-substituted allylamine, N,N-dialkyl-substituted allylamine, diallylamine and N-alkyl-substituted diallylamine and (ii) one or more of monomers other than those monomers listed in (i) the above.

8. The negative electrode active material for nonaqueous secondary batteries according to claim 6, wherein the reaction product of polymer (b1) and polymer (b2) accounts for from 0.01% to 10% by mass relative to the active material (A).

9. An organic compound for a negative electrode active material for a nonaqueous secondary battery, which is
a polymer comprising:
at least one basic group selected from the group consisting of a primary amino group and a secondary amino group; and
a lithium ion-coordinating group which comprises an oxyalkylene group,
wherein
a structure (S) of the polymer comprises at least one structure selected from the group consisting of a graft structure, a star structure and a three-dimensional network structure, and
the structure (S) is formed by crosslinking.

10. A negative electrode for a nonaqueous secondary battery, comprising: the negative electrode active material for nonaqueous secondary batteries of claim 1.

11. A nonaqueous secondary battery, comprising:
a positive electrode;
the negative electrode of claim 10; and
an electrolyte.

12. The negative electrode active material for nonaqueous secondary batteries of claim 1, wherein a content of the organic compound (B) is from 0.01% to 10 mass % relative to the active material (A).

13. The nonaqueous secondary battery of claim 11, wherein a content of the organic compound (B) is from 0.01% to 10 mass % relative to the active material (A).

14. The negative electrode active material for nonaqueous secondary batteries of claim 1, wherein the structure (S) of the compound (B) comprises at least one structure selected from the group consisting of a star structure and a three-dimensional network structure.

15. The organic compound of claim 9, wherein the structure (S) of the polymer comprises at least one structure selected from the group consisting of a star structure and a three-dimensional network structure.

16. The negative electrode active material for a nonaqueous secondary battery according to claim 1, wherein the organic compound (B) comprises a moiety represented by formula (2-1) and/or a moiety represented by formula (3-1), as the at least one basic group:

wherein:
$R^6$ represents an alkylene group having from 1 to 6 carbon atoms; $R^7$ and $R^8$ each represent a hydrogen atom; $R^{13}$ and $R^{14}$ each independently represent an alkylene group having from 1 to 6 carbon atoms; $R^{15}$ represents a hydrogen atom; and * represents a position wherein (2-1) or (3-1) binds to another moiety in the organic compound (B).

17. The organic compound according to claim 9, wherein the organic compound comprises a moiety represented by formula (2-1) and/or a moiety represented by formula (3-1), as the at least one basic group:

wherein:

$R^6$ represents an alkylene group having from 1 to 6 carbon atoms; $R^7$ and $R^8$ each represent a hydrogen atom; $R^{13}$ and $R^{14}$ each independently represent an alkylene group having from 1 to 6 carbon atoms; $R^{15}$ represents a hydrogen atom; and * represents a position wherein (2-1) or (3-1) binds to another moiety in the organic compound.

* * * * *

UNITED STATES PATENT AND TRADEMARK OFFICE
CERTIFICATE OF CORRECTION

| | | |
|---|---|---|
| PATENT NO. | : 11,075,385 B2 | Page 1 of 1 |
| APPLICATION NO. | : 14/459755 | |
| DATED | : July 27, 2021 | |
| INVENTOR(S) | : Yuuya Arikawa et al. | |

It is certified that error appears in the above-identified patent and that said Letters Patent is hereby corrected as shown below:

On the Title Page

Item (30), the Foreign Application Priority Data is incorrect. Item (30) should read:
-- (30) Foreign Application Priority Data
Feb. 14, 2012 (JP) JP2012-029988
Mar. 30, 2012 (JP) JP2012-080655
May 16, 2012 (JP) JP2012-112317
Jun. 22, 2012 (JP) JP2012-141100
Jul. 27, 2012 (JP) JP2012-167659
Aug. 22, 2012 (JP) JP2012-183037
Dec. 18, 2012 (JP) JP2012-275819
Dec. 18, 2012 (JP) JP2012-275820
Jan. 16, 2013 (JP) JP2013-005457 --

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*